(12) United States Patent
Larsson et al.

(10) Patent No.: US 10,445,114 B2
(45) Date of Patent: *Oct. 15, 2019

(54) ASSOCIATING COMMAND SURFACES WITH MULTIPLE ACTIVE COMPONENTS

(71) Applicant: Microsoft Technology Licensing, LLC., Redmond, WA (US)

(72) Inventors: Josef Larsson, Des Moines, WA (US); Eric Bailey, Issaquah, WA (US); Tim McConnell, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/410,386

(22) Filed: Jan. 19, 2017

(65) Prior Publication Data
US 2017/0132018 A1    May 11, 2017

Related U.S. Application Data

(63) Continuation of application No. 12/059,644, filed on Mar. 31, 2008, now Pat. No. 9,588,781.

(51) Int. Cl.
G06F 3/0482    (2013.01)
G06F 9/451    (2018.01)
G06F 3/0483    (2013.01)

(52) U.S. Cl.
CPC ............ G06F 9/451 (2018.02); G06F 3/0482 (2013.01); G06F 3/0483 (2013.01)

(58) Field of Classification Search
CPC .... G06F 3/0481; G06F 3/0482; G06F 3/0483; G06F 3/0236; G06F 17/30873; G06F 17/3089; G06F 17/30997

USPC ....... 715/760, 765, 779, 810, 825, 835, 841, 715/845; 707/707; 709/203, 217–219; 711/100

See application file for complete search history.

(56) References Cited

U.S. PATENT DOCUMENTS

| | | |
|---|---|---|
| 3,946,911 A | 3/1976 | Morane et al. |
| 5,134,915 A | 8/1992 | Fukano et al. |
| 5,220,675 A | 6/1993 | Padawer et al. |

(Continued)

FOREIGN PATENT DOCUMENTS

| | | |
|---|---|---|
| AU | 2005203411 A1 | 3/2006 |
| AU | 2007255043 A1 | 12/2007 |

(Continued)

OTHER PUBLICATIONS

U.S. Appl. No. 14/635,605, Ex-Parte Quayle Action mailed May 4, 2017, 8 pages.

(Continued)

*Primary Examiner* — Rinna Yi

(57) ABSTRACT

The same command surface on a page may be associated with unrelated components and applications. Each of the components registers the commands associated with a shared command surface that they will be utilizing. Each component may utilize an arbitrary number of commands that are associated with the command surface. The command manager acts as a message broker between the components on the page and the command surfaces. When a command that is associated with a command surface is received, the command manager dispatches the command message to the appropriate components.

16 Claims, 4 Drawing Sheets

(56) References Cited

U.S. PATENT DOCUMENTS

| | | |
|---|---|---|
| 5,247,438 A | 9/1993 | Subas et al. |
| 5,305,435 A | 4/1994 | Bronson |
| 5,307,086 A | 4/1994 | Griffin et al. |
| 5,323,314 A | 6/1994 | Baber et al. |
| 5,412,772 A | 5/1995 | Monson |
| 5,414,809 A | 5/1995 | Hogan et al. |
| 5,457,476 A | 10/1995 | Jenson |
| 5,461,708 A | 10/1995 | Kahn |
| 5,480,894 A | 1/1996 | Hider et al. |
| 5,502,805 A | 3/1996 | Anderson et al. |
| 5,533,184 A | 7/1996 | Malcolm |
| 5,559,875 A | 9/1996 | Bieselin et al. |
| 5,581,677 A | 12/1996 | Myers et al. |
| 5,581,686 A * | 12/1996 | Koppolu ............. G06F 3/0481 715/784 |
| 5,592,602 A | 1/1997 | Edmunds et al. |
| 5,673,403 A | 9/1997 | Brown et al. |
| 5,694,610 A | 12/1997 | Habib et al. |
| 5,764,960 A | 6/1998 | Perks et al. |
| 5,787,295 A | 7/1998 | Nakao |
| 5,793,365 A | 8/1998 | Tang et al. |
| 5,796,393 A | 8/1998 | MacNaughton et al. |
| 5,828,367 A | 10/1998 | Kuga |
| 5,844,588 A | 12/1998 | Anderson |
| 5,850,561 A | 12/1998 | Church et al. |
| 5,864,848 A | 1/1999 | Horvitz et al. |
| 5,872,973 A | 2/1999 | Mitchell et al. |
| 5,873,108 A | 2/1999 | Goyal et al. |
| 5,874,953 A | 2/1999 | Webster et al. |
| 5,874,956 A | 2/1999 | LaHood |
| 5,884,572 A | 3/1999 | Kawaguchi |
| 5,893,073 A | 4/1999 | Kasso et al. |
| 5,910,895 A | 6/1999 | Proskauer |
| 5,914,714 A | 6/1999 | Brown |
| 5,917,489 A | 6/1999 | Thurlow et al. |
| 5,924,089 A | 7/1999 | Mocek et al. |
| 5,937,160 A | 8/1999 | Davis et al. |
| 5,963,938 A | 10/1999 | Wilson et al. |
| 5,999,173 A | 12/1999 | Ubillos |
| 6,002,395 A | 12/1999 | Wagner et al. |
| 6,016,478 A | 1/2000 | Zhang et al. |
| 6,038,395 A | 3/2000 | Chow et al. |
| 6,038,542 A | 3/2000 | Ruckdashel |
| 6,067,551 A | 5/2000 | Brown et al. |
| 6,073,110 A | 6/2000 | Rhodes et al. |
| 6,073,142 A | 6/2000 | Geiger et al. |
| 6,088,707 A | 7/2000 | Bates et al. |
| 6,092,103 A | 7/2000 | Pritsch |
| 6,137,488 A | 10/2000 | Kraft et al. |
| 6,154,740 A | 11/2000 | Shah |
| 6,154,755 A | 11/2000 | Dellert et al. |
| 6,160,554 A | 12/2000 | Krause |
| 6,188,401 B1 | 2/2001 | Peyer |
| 6,189,024 B1 | 2/2001 | Bauersfeld et al. |
| 6,195,094 B1 | 2/2001 | Celebiler |
| 6,199,102 B1 | 3/2001 | Cobb |
| 6,237,135 B1 | 5/2001 | Timbol |
| 6,239,798 B1 | 5/2001 | Ludolph et al. |
| 6,269,341 B1 | 7/2001 | Redcay, Jr. |
| 6,272,488 B1 | 8/2001 | Chang et al. |
| 6,307,574 B1 | 10/2001 | Ashe et al. |
| 6,311,195 B1 | 10/2001 | Hachiya et al. |
| 6,313,854 B1 | 11/2001 | Gibson |
| 6,326,962 B1 | 12/2001 | Szabo |
| 6,327,046 B1 | 12/2001 | Miyamoto et al. |
| 6,330,578 B1 | 12/2001 | Savin et al. |
| 6,330,589 B1 | 12/2001 | Kennedy |
| 6,341,277 B1 | 1/2002 | Coden et al. |
| 6,342,901 B1 | 1/2002 | Adler et al. |
| 6,356,893 B1 | 3/2002 | Itakura et al. |
| 6,369,840 B1 | 4/2002 | Barnett et al. |
| 6,374,304 B1 | 4/2002 | Chiashi |
| 6,385,769 B1 | 5/2002 | Lewallen |
| 6,430,563 B1 | 8/2002 | Fritz et al. |
| 6,433,831 B1 | 8/2002 | Dinwiddie et al. |
| 6,434,598 B1 | 8/2002 | Gish |
| 6,442,527 B1 | 8/2002 | Worthington |
| 6,446,118 B1 | 9/2002 | Gottlieb |
| 6,457,062 B1 | 9/2002 | Pivowar et al. |
| 6,466,240 B1 | 10/2002 | Maslov |
| 6,469,723 B1 | 10/2002 | Gould et al. |
| 6,484,180 B1 | 11/2002 | Lyons et al. |
| 6,493,006 B1 | 12/2002 | Gourdol |
| 6,493,007 B1 | 12/2002 | Pang |
| 6,507,845 B1 | 1/2003 | Cohen et al. |
| 6,529,918 B2 | 3/2003 | Takahashi |
| 6,567,509 B1 | 5/2003 | Gusler et al. |
| 6,570,890 B1 | 5/2003 | Keenan et al. |
| 6,584,501 B1 | 6/2003 | Cartsonis et al. |
| 6,584,504 B1 | 6/2003 | Choe |
| 6,624,831 B1 | 9/2003 | Shahine et al. |
| 6,633,867 B1 | 10/2003 | Kraft et al. |
| 6,654,791 B1 | 11/2003 | Bates et al. |
| 6,701,513 B1 | 3/2004 | Bailey |
| 6,707,454 B1 | 3/2004 | Barg et al. |
| 6,721,402 B2 | 4/2004 | Usami |
| 6,725,228 B1 | 4/2004 | Clark et al. |
| 6,750,850 B2 | 6/2004 | O'Leary |
| 6,753,887 B2 | 6/2004 | Carolan et al. |
| 6,789,107 B1 | 9/2004 | Bates et al. |
| 6,799,095 B1 | 9/2004 | Owen et al. |
| 6,816,904 B1 | 11/2004 | Ludwig et al. |
| 6,832,244 B1 | 12/2004 | Raghunandan |
| 6,847,989 B1 | 1/2005 | Chastain et al. |
| 6,882,353 B2 | 4/2005 | Nettles et al. |
| 6,892,193 B2 | 5/2005 | Bolle et al. |
| 6,892,196 B1 | 5/2005 | Hughes |
| 6,895,426 B1 | 5/2005 | Cortright et al. |
| 6,907,423 B2 | 6/2005 | Weil et al. |
| 6,925,605 B2 | 8/2005 | Bates et al. |
| 6,928,613 B1 | 8/2005 | Ishii et al. |
| 6,934,740 B1 | 8/2005 | Lawande et al. |
| 6,941,304 B2 | 9/2005 | Gainey et al. |
| 6,956,429 B1 | 10/2005 | Elbanhawy |
| 6,981,209 B1 | 12/2005 | Parikh et al. |
| 6,990,652 B1 | 1/2006 | Parthasarathy et al. |
| 6,990,654 B2 | 1/2006 | Carroll, Jr. |
| 7,016,864 B1 | 3/2006 | Notz et al. |
| 7,044,363 B2 | 5/2006 | Silverbrook et al. |
| 7,069,538 B1 | 6/2006 | Renshaw |
| 7,085,757 B2 | 8/2006 | Dettinger et al. |
| 7,086,006 B2 | 8/2006 | Subramanian et al. |
| 7,096,218 B2 | 8/2006 | Schirmer et al. |
| 7,103,849 B2 | 9/2006 | Aikawa |
| 7,111,238 B1 | 9/2006 | Kuppusamy et al. |
| 7,113,941 B2 | 9/2006 | Arend et al. |
| 7,117,370 B2 | 10/2006 | Khan et al. |
| 7,117,436 B1 | 10/2006 | O'Rourke et al. |
| 7,134,095 B1 | 11/2006 | Smith et al. |
| 7,149,983 B1 | 12/2006 | Robertson et al. |
| 7,174,361 B1 | 2/2007 | Paas |
| 7,181,697 B2 | 2/2007 | Tai et al. |
| 7,188,317 B1 | 3/2007 | Hazel |
| 7,200,636 B2 | 4/2007 | Harding |
| 7,206,813 B2 | 4/2007 | Dunbar et al. |
| 7,206,814 B2 | 4/2007 | Kirsch |
| 7,216,301 B2 | 5/2007 | Moehrle |
| 7,216,302 B2 | 5/2007 | Rodden et al. |
| 7,218,976 B2 | 5/2007 | Minagawa |
| 7,240,323 B1 | 7/2007 | Desai et al. |
| 7,251,640 B2 | 7/2007 | Baumard |
| 7,277,572 B2 | 10/2007 | MacInnes et al. |
| 7,281,245 B2 | 10/2007 | Reynar et al. |
| 7,287,233 B2 | 10/2007 | Arend et al. |
| 7,290,033 B1 | 10/2007 | Goldman et al. |
| 7,296,241 B2 | 11/2007 | Oshiro et al. |
| 7,356,537 B2 | 4/2008 | Reynar et al. |
| 7,356,772 B2 | 4/2008 | Brownholtz et al. |
| 7,362,311 B2 | 4/2008 | Filner et al. |
| 7,370,282 B2 | 5/2008 | Cary |
| 7,380,236 B2 | 5/2008 | Hawley |
| 7,395,221 B2 | 7/2008 | Doss et al. |
| 7,395,500 B2 | 7/2008 | Whittle et al. |
| 7,395,540 B2 | 7/2008 | Rogers |

(56) References Cited

U.S. PATENT DOCUMENTS

| | | |
|---|---|---|
| 7,421,660 B2 | 9/2008 | Charnock et al. |
| 7,421,690 B2 | 9/2008 | Forstall et al. |
| 7,426,713 B2 | 9/2008 | Duggan et al. |
| 7,461,077 B1 | 12/2008 | Greenwood |
| 7,464,343 B2 | 12/2008 | Shaw et al. |
| 7,469,385 B2 | 12/2008 | Harper et al. |
| 7,472,117 B2 | 12/2008 | Dettinger et al. |
| 7,472,374 B1 | 12/2008 | Dillman et al. |
| 7,499,907 B2 | 3/2009 | Brown et al. |
| 7,509,328 B2 | 3/2009 | Weiss et al. |
| 7,565,403 B2 | 7/2009 | Horvitz et al. |
| 7,584,253 B2 | 9/2009 | Curbow et al. |
| 7,610,575 B2 | 10/2009 | Sproule |
| 7,632,311 B2 | 12/2009 | Seedhom et al. |
| 7,661,075 B2 | 2/2010 | Lahdesmaki |
| 7,664,821 B1 | 2/2010 | Ancin et al. |
| 7,676,767 B2 | 3/2010 | Hofmeister et al. |
| 7,681,149 B2 | 3/2010 | Lahdesmaki |
| 7,685,116 B2 | 3/2010 | Pell et al. |
| 7,707,255 B2 | 4/2010 | Satterfield et al. |
| 7,711,742 B2 | 5/2010 | Bennett et al. |
| 7,716,593 B2 | 5/2010 | Durazo et al. |
| 7,739,259 B2 | 6/2010 | Hartwell et al. |
| 7,747,966 B2 | 6/2010 | Leukart et al. |
| 7,769,698 B2 | 8/2010 | Matic |
| 7,779,386 B2 | 8/2010 | Seitz et al. |
| 7,788,598 B2 | 8/2010 | Bansal et al. |
| 7,802,199 B2 | 9/2010 | Shneerson et al. |
| 7,827,546 B1 | 11/2010 | Jones et al. |
| 7,831,902 B2 | 11/2010 | Sourov et al. |
| 7,853,877 B2 | 12/2010 | Giesen et al. |
| 7,860,901 B2 | 12/2010 | Cheng et al. |
| 7,865,868 B2 | 1/2011 | Falzone Schaw et al. |
| 7,870,465 B2 | 1/2011 | VerSteeg |
| 7,886,290 B2 | 2/2011 | Dhanjal et al. |
| 7,895,531 B2 | 2/2011 | Radtke et al. |
| 7,908,580 B2 | 3/2011 | Stubbs et al. |
| 7,925,621 B2 | 4/2011 | Sikchi et al. |
| 7,949,963 B1 * | 5/2011 | Pham .................... G06F 17/24 715/851 |
| 8,046,683 B2 | 10/2011 | Larcheveque et al. |
| 8,117,542 B2 | 2/2012 | Radtke et al. |
| 8,146,016 B2 | 3/2012 | Himberger et al. |
| 8,150,930 B2 | 4/2012 | Satterfield et al. |
| 8,171,417 B2 | 5/2012 | Bamford et al. |
| 8,201,103 B2 | 6/2012 | Dukhon et al. |
| 8,239,882 B2 | 8/2012 | Dhanjal et al. |
| 8,285,806 B2 | 10/2012 | Yu |
| 8,302,014 B2 | 10/2012 | Lezama Guadarrama et al. |
| 8,402,096 B2 | 3/2013 | Affronti et al. |
| 8,479,122 B2 | 7/2013 | Hotelling et al. |
| 8,484,578 B2 | 7/2013 | Gordner et al. |
| 8,605,090 B2 | 12/2013 | Garg et al. |
| 8,627,222 B2 | 1/2014 | Hartwell et al. |
| 8,627,562 B2 | 1/2014 | Sutter et al. |
| 8,638,333 B2 | 1/2014 | Garg et al. |
| 8,689,137 B2 | 4/2014 | McCormack et al. |
| 8,762,880 B2 | 6/2014 | Dukhon et al. |
| 8,799,353 B2 | 8/2014 | Larsson et al. |
| 8,799,808 B2 | 8/2014 | Satterfield et al. |
| 8,839,139 B2 | 9/2014 | Leukart et al. |
| 8,904,287 B2 | 12/2014 | Kumar et al. |
| 9,015,624 B2 | 4/2015 | Radtke et al. |
| 9,046,983 B2 | 6/2015 | Zhao et al. |
| 9,098,473 B2 | 8/2015 | Dukhon et al. |
| 9,182,885 B2 | 11/2015 | Ruscher et al. |
| 9,304,658 B2 | 4/2016 | Mercer |
| 9,338,114 B2 | 5/2016 | Affronti et al. |
| 9,542,667 B2 | 1/2017 | Taboada et al. |
| 9,619,116 B2 | 4/2017 | Dukhon et al. |
| 9,645,698 B2 | 5/2017 | Himberger et al. |
| 9,665,850 B2 | 5/2017 | McCann et al. |
| 9,690,450 B2 | 6/2017 | Satterfield et al. |
| 9,715,678 B2 | 7/2017 | Hill et al. |
| 9,727,989 B2 | 8/2017 | Garg et al. |
| 9,762,637 B2 | 9/2017 | Bullotta et al. |
| 9,864,489 B2 | 1/2018 | Dean et al. |
| 9,875,009 B2 | 1/2018 | Zhao et al. |
| 2001/0034762 A1 | 10/2001 | Jacobs et al. |
| 2001/0038395 A1 | 11/2001 | Holtzblatt et al. |
| 2001/0040627 A1 | 11/2001 | Obradovich |
| 2001/0044736 A1 | 11/2001 | Jacobs et al. |
| 2001/0044741 A1 | 11/2001 | Jacobs et al. |
| 2001/0049677 A1 | 12/2001 | Talib et al. |
| 2002/0004734 A1 | 1/2002 | Nishizawa |
| 2002/0013562 A1 | 1/2002 | Mizutani |
| 2002/0023134 A1 | 2/2002 | Roskowski et al. |
| 2002/0024638 A1 | 2/2002 | Hidari et al. |
| 2002/0029247 A1 | 3/2002 | Kawamoto |
| 2002/0052880 A1 | 5/2002 | Fruensgaard et al. |
| 2002/0052916 A1 | 5/2002 | Kloba et al. |
| 2002/0054101 A1 | 5/2002 | Beatty |
| 2002/0054128 A1 | 5/2002 | Lau et al. |
| 2002/0063734 A1 | 5/2002 | Khalfay et al. |
| 2002/0073091 A1 | 6/2002 | Jain et al. |
| 2002/0073156 A1 | 6/2002 | Newman |
| 2002/0083054 A1 | 6/2002 | Peltonen et al. |
| 2002/0089543 A1 | 7/2002 | Ostergaard et al. |
| 2002/0091697 A1 | 7/2002 | Huang et al. |
| 2002/0097266 A1 | 7/2002 | Hachiya et al. |
| 2002/0116508 A1 | 8/2002 | Khan et al. |
| 2002/0120695 A1 | 8/2002 | Engstrom |
| 2002/0123984 A1 | 9/2002 | Prakash |
| 2002/0123991 A1 | 9/2002 | Asami et al. |
| 2002/0129052 A1 | 9/2002 | Glazer et al. |
| 2002/0158876 A1 | 10/2002 | Janssen |
| 2002/0175938 A1 | 11/2002 | Hackworth |
| 2002/0186257 A1 | 12/2002 | Cadiz et al. |
| 2002/0188515 A1 | 12/2002 | Nakata et al. |
| 2003/0005051 A1 | 1/2003 | Gottlieb |
| 2003/0005056 A1 | 1/2003 | Yamamoto et al. |
| 2003/0011564 A1 | 1/2003 | Ushino et al. |
| 2003/0014421 A1 | 1/2003 | Jung |
| 2003/0016248 A1 | 1/2003 | Hayes Ubillos |
| 2003/0028560 A1 | 2/2003 | Kudrolli et al. |
| 2003/0035012 A1 | 2/2003 | Kurtenbach |
| 2003/0043200 A1 | 3/2003 | Faieta et al. |
| 2003/0046528 A1 | 3/2003 | Haitani et al. |
| 2003/0050986 A1 | 3/2003 | Matthews et al. |
| 2003/0064707 A1 | 4/2003 | Yoneyama |
| 2003/0069892 A1 | 4/2003 | Hind et al. |
| 2003/0069900 A1 | 4/2003 | Hind et al. |
| 2003/0084035 A1 | 5/2003 | Emerick, III |
| 2003/0097640 A1 | 5/2003 | Abrams et al. |
| 2003/0106024 A1 | 6/2003 | Silverbrook et al. |
| 2003/0110191 A1 | 6/2003 | Handsaker et al. |
| 2003/0128243 A1 | 7/2003 | Okamoto et al. |
| 2003/0132972 A1 | 7/2003 | Pang |
| 2003/0154254 A1 | 8/2003 | Awasthi |
| 2003/0156140 A1 | 8/2003 | Watanabe |
| 2003/0163537 A1 | 8/2003 | Rohall et al. |
| 2003/0177190 A1 | 9/2003 | Moody et al. |
| 2003/0187586 A1 | 10/2003 | Katzenmaier et al. |
| 2003/0187937 A1 | 10/2003 | Yao et al. |
| 2003/0200267 A1 | 10/2003 | Garrigues |
| 2003/0220138 A1 | 11/2003 | Walker et al. |
| 2003/0225823 A1 | 12/2003 | Meeuwissen et al. |
| 2003/0225853 A1 | 12/2003 | Wang et al. |
| 2003/0227481 A1 | 12/2003 | Arend et al. |
| 2003/0229668 A1 | 12/2003 | Malik |
| 2003/0229673 A1 | 12/2003 | Malik |
| 2004/0002941 A1 | 1/2004 | Thorne et al. |
| 2004/0006570 A1 | 1/2004 | Gelb et al. |
| 2004/0010513 A1 | 1/2004 | Scherr et al. |
| 2004/0010933 A1 | 1/2004 | Mertens et al. |
| 2004/0021647 A1 | 2/2004 | Iwema et al. |
| 2004/0024824 A1 | 2/2004 | Ferguson et al. |
| 2004/0030993 A1 | 2/2004 | Hong huey et al. |
| 2004/0044735 A1 | 3/2004 | Hoblit |
| 2004/0061713 A1 | 4/2004 | Jennings |
| 2004/0068695 A1 | 4/2004 | Daniell et al. |
| 2004/0073503 A1 | 4/2004 | Morales et al. |
| 2004/0083432 A1 | 4/2004 | Kawamura et al. |
| 2004/0088359 A1 | 5/2004 | Simpson |

(56) References Cited

U.S. PATENT DOCUMENTS

| | | |
|---|---|---|
| 2004/0093290 A1 | 5/2004 | Doss et al. |
| 2004/0119755 A1 | 6/2004 | Guibourge |
| 2004/0125142 A1 | 7/2004 | Mock et al. |
| 2004/0128275 A1 | 7/2004 | Moehrle |
| 2004/0135805 A1 | 7/2004 | Gottsacker et al. |
| 2004/0135811 A1 | 7/2004 | Pickering et al. |
| 2004/0139435 A1 | 7/2004 | Cui et al. |
| 2004/0153373 A1 | 8/2004 | Song et al. |
| 2004/0153973 A1 | 8/2004 | Horwitz |
| 2004/0181471 A1 | 9/2004 | Rogers |
| 2004/0189694 A1 | 9/2004 | Kurtz et al. |
| 2004/0205536 A1 | 10/2004 | Newman et al. |
| 2004/0212640 A1 | 10/2004 | Mann et al. |
| 2004/0215612 A1 | 10/2004 | Brody |
| 2004/0221234 A1 | 11/2004 | Imai |
| 2004/0221309 A1 | 11/2004 | Zaner et al. |
| 2004/0233239 A1 | 11/2004 | Lahdesmaki |
| 2004/0236796 A1 | 11/2004 | Bhatt et al. |
| 2004/0254928 A1 | 12/2004 | Vronay et al. |
| 2004/0260756 A1 | 12/2004 | Forstall et al. |
| 2004/0261013 A1 | 12/2004 | Wynn et al. |
| 2004/0268270 A1 | 12/2004 | Hill et al. |
| 2005/0004989 A1 | 1/2005 | Satterfield et al. |
| 2005/0005235 A1 | 1/2005 | Satterfield et al. |
| 2005/0015361 A1 | 1/2005 | Payton et al. |
| 2005/0015364 A1 | 1/2005 | Payton et al. |
| 2005/0021521 A1 | 1/2005 | Wycoff |
| 2005/0027779 A1 | 2/2005 | Schinner |
| 2005/0033614 A1 | 2/2005 | Lettovsky et al. |
| 2005/0033811 A1 | 2/2005 | Bhogal et al. |
| 2005/0055449 A1 | 3/2005 | Rappold, III |
| 2005/0060337 A1 | 3/2005 | Chou et al. |
| 2005/0065966 A1 | 3/2005 | Diab |
| 2005/0071242 A1 | 3/2005 | Allen et al. |
| 2005/0097465 A1 | 5/2005 | Giesen et al. |
| 2005/0108348 A1 | 5/2005 | Lee |
| 2005/0114778 A1 | 5/2005 | Branson et al. |
| 2005/0114781 A1 | 5/2005 | Brownholtz et al. |
| 2005/0132010 A1 | 6/2005 | Muller |
| 2005/0132053 A1 | 6/2005 | Roth et al. |
| 2005/0138552 A1 | 6/2005 | Venolia |
| 2005/0144157 A1 | 6/2005 | Moody et al. |
| 2005/0144284 A1 | 6/2005 | Ludwig et al. |
| 2005/0144560 A1 | 6/2005 | Gruen et al. |
| 2005/0144568 A1 | 6/2005 | Gruen et al. |
| 2005/0144572 A1 | 6/2005 | Wattenberg et al. |
| 2005/0154765 A1 | 7/2005 | Seitz et al. |
| 2005/0177789 A1 | 8/2005 | Abbar et al. |
| 2005/0185920 A1 | 8/2005 | Harper et al. |
| 2005/0188043 A1 | 8/2005 | Cortright et al. |
| 2005/0203975 A1 | 9/2005 | Jindal et al. |
| 2005/0222985 A1 | 10/2005 | Buchheit et al. |
| 2005/0223057 A1 | 10/2005 | Buchheit et al. |
| 2005/0223066 A1 | 10/2005 | Buchheit et al. |
| 2005/0234910 A1 | 10/2005 | Buchheit et al. |
| 2005/0240902 A1 | 10/2005 | Bunker et al. |
| 2005/0251757 A1 | 11/2005 | Farn |
| 2005/0289109 A1 | 12/2005 | Arrouye et al. |
| 2005/0289158 A1 | 12/2005 | Weiss et al. |
| 2005/0289159 A1 | 12/2005 | Hadley et al. |
| 2006/0026033 A1 | 2/2006 | Brydon et al. |
| 2006/0026145 A1 | 2/2006 | Beringer et al. |
| 2006/0026213 A1 | 2/2006 | Yaskin et al. |
| 2006/0026242 A1 | 2/2006 | Kuhlmann et al. |
| 2006/0036946 A1 | 2/2006 | Radtke et al. |
| 2006/0036950 A1 | 2/2006 | Himberger et al. |
| 2006/0059035 A1 | 3/2006 | Kraft et al. |
| 2006/0064434 A1 | 3/2006 | Gilbert et al. |
| 2006/0069604 A1 | 3/2006 | Leukart et al. |
| 2006/0069684 A1 | 3/2006 | Vadlamani et al. |
| 2006/0069686 A1 | 3/2006 | Beyda et al. |
| 2006/0074844 A1 | 4/2006 | Frankel et al. |
| 2006/0080363 A1 | 4/2006 | Vadlamani et al. |
| 2006/0080468 A1 | 4/2006 | Vadlamani et al. |
| 2006/0085502 A1 | 4/2006 | Sundararajan et al. |
| 2006/0117302 A1 | 6/2006 | Mercer et al. |
| 2006/0132812 A1 | 6/2006 | Barnes et al. |
| 2006/0155689 A1 | 7/2006 | Blakeley et al. |
| 2006/0161849 A1 | 7/2006 | Miller et al. |
| 2006/0161863 A1 | 7/2006 | Gallo |
| 2006/0168522 A1 | 7/2006 | Bala |
| 2006/0173961 A1 | 8/2006 | Turski et al. |
| 2006/0184867 A1 | 8/2006 | Shpigel |
| 2006/0200432 A1 | 9/2006 | Flinn et al. |
| 2006/0200455 A1 | 9/2006 | Wilson |
| 2006/0248012 A1 | 11/2006 | Kircher et al. |
| 2006/0253830 A1 | 11/2006 | Rajanala et al. |
| 2006/0259449 A1 | 11/2006 | Betz et al. |
| 2006/0271869 A1 | 11/2006 | Thanu et al. |
| 2006/0271910 A1 | 11/2006 | Burcham et al. |
| 2006/0282784 A1 | 12/2006 | Taylor et al. |
| 2006/0282817 A1 | 12/2006 | Darst et al. |
| 2006/0294526 A1 | 12/2006 | Hambrick et al. |
| 2007/0006327 A1 | 1/2007 | Lal et al. |
| 2007/0011258 A1 | 1/2007 | Khoo |
| 2007/0016857 A1* | 1/2007 | Polleck .............. G06F 3/1219 715/234 |
| 2007/0033250 A1 | 2/2007 | Levin et al. |
| 2007/0050182 A1 | 3/2007 | Sneddon et al. |
| 2007/0061738 A1 | 3/2007 | Taboada et al. |
| 2007/0083813 A1 | 4/2007 | Lui et al. |
| 2007/0094230 A1 | 4/2007 | Subramaniam et al. |
| 2007/0094597 A1 | 4/2007 | Rostom |
| 2007/0101299 A1 | 5/2007 | Shaw et al. |
| 2007/0124696 A1 | 5/2007 | Mullender et al. |
| 2007/0130276 A1 | 6/2007 | Zhang et al. |
| 2007/0143662 A1 | 6/2007 | Carlson et al. |
| 2007/0156519 A1 | 7/2007 | Agassi et al. |
| 2007/0179841 A1 | 8/2007 | Agassi et al. |
| 2007/0180040 A1 | 8/2007 | Etgen et al. |
| 2007/0186212 A1 | 8/2007 | Mazzaferri et al. |
| 2007/0203991 A1 | 8/2007 | Fisher et al. |
| 2007/0234290 A1 | 10/2007 | Ronen et al. |
| 2007/0266017 A1 | 11/2007 | Held et al. |
| 2007/0282956 A1 | 12/2007 | Staats |
| 2007/0283287 A1 | 12/2007 | Taylor et al. |
| 2008/0005247 A9 | 1/2008 | Khoo |
| 2008/0005249 A1 | 1/2008 | Hart |
| 2008/0005274 A1 | 1/2008 | Subbanna et al. |
| 2008/0005686 A1 | 1/2008 | Singh |
| 2008/0046518 A1 | 2/2008 | Tonnison et al. |
| 2008/0046828 A1 | 2/2008 | Bibliowicz et al. |
| 2008/0052670 A1 | 2/2008 | Espinosa et al. |
| 2008/0098229 A1 | 4/2008 | Hartrell et al. |
| 2008/0104505 A1 | 5/2008 | Keohane et al. |
| 2008/0109787 A1 | 5/2008 | Wang et al. |
| 2008/0134138 A1 | 6/2008 | Chamieh et al. |
| 2008/0141242 A1 | 6/2008 | Shapiro |
| 2008/0155555 A1 | 6/2008 | Kwong |
| 2008/0168146 A1 | 7/2008 | Fletcher |
| 2008/0244440 A1 | 10/2008 | Bailey et al. |
| 2008/0263462 A1 | 10/2008 | Mayer-ullmann et al. |
| 2009/0012984 A1 | 1/2009 | Ravid et al. |
| 2009/0031295 A1 | 1/2009 | Zhao et al. |
| 2009/0064090 A1 | 3/2009 | Anonsen et al. |
| 2009/0106375 A1 | 4/2009 | Carmel et al. |
| 2009/0144651 A1 | 6/2009 | Sprang et al. |
| 2009/0152349 A1 | 6/2009 | Bonev et al. |
| 2009/0158173 A1 | 6/2009 | Palahnuk et al. |
| 2009/0163183 A1 | 6/2009 | O'Donoghue et al. |
| 2009/0192845 A1 | 7/2009 | Gudipaty et al. |
| 2009/0205013 A1 | 8/2009 | Lowes |
| 2009/0217192 A1 | 8/2009 | Dean et al. |
| 2009/0217263 A1 | 8/2009 | Gebhart et al. |
| 2009/0259950 A1 | 10/2009 | Sullivan et al. |
| 2009/0319619 A1 | 12/2009 | Affronti et al. |
| 2009/0319911 A1 | 12/2009 | McCann et al. |
| 2010/0011310 A1 | 1/2010 | Rainisto |
| 2010/0011319 A1 | 1/2010 | Gourdol |
| 2010/0060645 A1 | 3/2010 | Garg et al. |
| 2010/0146478 A1 | 6/2010 | Head et al. |
| 2010/0159967 A1 | 6/2010 | Pounds et al. |
| 2010/0191818 A1 | 7/2010 | Satterfield et al. |
| 2010/0199261 A1 | 8/2010 | Shenfield et al. |

(56) References Cited

U.S. PATENT DOCUMENTS

| | | |
|---|---|---|
| 2010/0211889 A1 | 8/2010 | Durazo et al. |
| 2010/0223575 A1 | 9/2010 | Leukart et al. |
| 2010/0293470 A1 | 11/2010 | Zhao et al. |
| 2011/0041092 A1 | 2/2011 | Zhang |
| 2011/0055673 A1 | 3/2011 | Teng et al. |
| 2011/0072396 A1 | 3/2011 | Giesen et al. |
| 2011/0138273 A1 | 6/2011 | Radtke et al. |
| 2011/0225249 A1 | 9/2011 | Forstall et al. |
| 2011/0296322 A1 | 12/2011 | Dhanjal et al. |
| 2011/0307798 A1 | 12/2011 | Lezama guadarrama et al. |
| 2012/0179993 A1 | 7/2012 | Himberger et al. |
| 2012/0215866 A1 | 8/2012 | Satterfield et al. |
| 2013/0159879 A1 | 6/2013 | Affronti et al. |
| 2013/0283207 A1 | 10/2013 | Dukhon et al. |
| 2014/0115526 A1 | 4/2014 | Hartwell et al. |
| 2014/0132609 A1 | 5/2014 | Garg et al. |
| 2014/0258933 A1 | 9/2014 | Dukhon et al. |
| 2015/0220263 A1 | 8/2015 | Zhao et al. |
| 2015/0339281 A1 | 11/2015 | Dukhon et al. |
| 2015/0370771 A1 | 12/2015 | Dukhon et al. |
| 2017/0075952 A1 | 3/2017 | Hartwell et al. |
| 2017/0212877 A1 | 7/2017 | Dukhon et al. |
| 2017/0262810 A1 | 9/2017 | Mccann et al. |
| 2017/0337715 A1 | 11/2017 | Garg et al. |
| 2017/0357392 A1 | 12/2017 | Satterfiled et al. |

FOREIGN PATENT DOCUMENTS

| | | |
|---|---|---|
| AU | 2010216342 B2 | 7/2014 |
| BR | PI0503986 A | 3/2006 |
| CA | 2512036 A1 | 2/2006 |
| CA | 2512047 A1 | 2/2006 |
| CA | 2750422 A1 | 8/2010 |
| CA | 2650016 C | 9/2014 |
| CA | 2512036 C | 11/2015 |
| CN | 1553377 A | 12/2004 |
| CN | 1746914 A | 3/2006 |
| CN | 1755599 A | 4/2006 |
| CN | 1790243 A | 6/2006 |
| CN | 101243439 A | 8/2008 |
| CN | 102422255 B | 4/2012 |
| CN | 101243439 B | 6/2012 |
| CN | 102067166 B | 6/2013 |
| CN | 102077163 B | 10/2013 |
| CN | 102077199 B | 1/2014 |
| EP | 0584269 A1 | 3/1994 |
| EP | 587394 A1 | 3/1994 |
| EP | 0851368 A2 | 7/1998 |
| EP | 851368 A2 | 7/1998 |
| EP | 0910007 A2 | 4/1999 |
| EP | 1104151 A2 | 5/2001 |
| EP | 584269 B1 | 7/2003 |
| EP | 1376337 A1 | 1/2004 |
| EP | 1394713 A1 | 3/2004 |
| EP | 1462951 A1 | 9/2004 |
| EP | 1462999 A2 | 9/2004 |
| EP | 1564652 A2 | 8/2005 |
| EP | 1628198 A2 | 2/2006 |
| EP | 1628199 A2 | 2/2006 |
| EP | 1645972 A2 | 4/2006 |
| EP | 1672518 A2 | 6/2006 |
| EP | 1835434 A1 | 9/2007 |
| EP | 1915001 A1 | 4/2008 |
| GB | 2382683 A | 6/2003 |
| GB | 2391148 A | 1/2004 |
| ID | P0027717 B | 2/2006 |
| ID | P0027754 B | 4/2006 |
| JP | 03043824 A | 2/1991 |
| JP | 04186425 A | 7/1992 |
| JP | 04312186 A | 11/1992 |
| JP | 05204579 A | 8/1993 |
| JP | 06052282 A | 2/1994 |
| JP | 06202842 A | 7/1994 |
| JP | 06342357 A | 12/1994 |
| JP | 08255066 A | 10/1996 |
| JP | 2551757 B2 | 11/1996 |
| JP | 09204289 A | 8/1997 |
| JP | 10074217 A | 3/1998 |
| JP | 10326171 A | 12/1998 |
| JP | 11039292 A | 2/1999 |
| JP | 11175258 A | 7/1999 |
| JP | 11259200 A | 9/1999 |
| JP | 2000353130 A | 12/2000 |
| JP | 2001034775 A | 2/2001 |
| JP | 2001056741 A | 2/2001 |
| JP | 2001503893 A | 3/2001 |
| JP | 2001109673 A | 4/2001 |
| JP | 2001222477 A | 8/2001 |
| JP | 2001337944 A | 12/2001 |
| JP | 2002324055 A | 11/2002 |
| JP | 2003015719 A | 1/2003 |
| JP | 2003101768 A | 4/2003 |
| JP | 2003198630 A | 7/2003 |
| JP | 2003216427 A | 7/2003 |
| JP | 2003256258 A | 9/2003 |
| JP | 2003256302 A | 9/2003 |
| JP | 2003308145 A | 10/2003 |
| JP | 2003316630 A | 11/2003 |
| JP | 2004078512 A | 3/2004 |
| JP | 2004086893 A | 3/2004 |
| JP | 2004086896 A | 3/2004 |
| JP | 2004102803 A | 4/2004 |
| JP | 2004512578 A | 4/2004 |
| JP | 2004145569 A | 5/2004 |
| JP | 2004159261 A | 6/2004 |
| JP | 2004185464 A | 7/2004 |
| JP | 2004318842 A | 11/2004 |
| JP | 2004342115 A | 12/2004 |
| JP | 2005025550 A | 1/2005 |
| JP | 2005031995 A | 2/2005 |
| JP | 2005032041 A | 2/2005 |
| JP | 2005115914 A | 4/2005 |
| JP | 2005182353 A | 7/2005 |
| JP | 2005236089 A | 9/2005 |
| JP | 2005322082 A | 11/2005 |
| JP | 2005352849 A | 12/2005 |
| JP | 2007280180 A | 10/2007 |
| JP | 2007531165 A | 11/2007 |
| JP | 2008047067 A | 2/2008 |
| JP | 2008117019 A | 5/2008 |
| JP | 5021185 B2 | 9/2012 |
| JP | 5079701 B2 | 11/2012 |
| JP | 5139984 B2 | 2/2013 |
| JP | 5190452 B2 | 4/2013 |
| JP | 5193042 B2 | 5/2013 |
| JP | 5221757 B2 | 6/2013 |
| JP | 5266384 B2 | 8/2013 |
| JP | 5480894 B2 | 4/2014 |
| JP | 5486595 B2 | 5/2014 |
| JP | 5559817 B2 | 7/2014 |
| JP | 5559845 B2 | 7/2014 |
| JP | 5597698 B2 | 10/2014 |
| KR | 1020010091344 A | 10/2001 |
| KR | 1020020004723 A | 1/2002 |
| KR | 100388254 B1 | 4/2002 |
| KR | 1020020066643 A | 8/2002 |
| KR | 100359378 B1 | 10/2002 |
| KR | 1020030070685 A | 9/2003 |
| KR | 1020030072539 A | 9/2003 |
| KR | 20040071813 A | 8/2004 |
| KR | 1020050023805 A | 3/2005 |
| KR | 1020050036702 A | 4/2005 |
| KR | 1020060046735 A | 5/2006 |
| KR | 1020070000506 A | 1/2007 |
| KR | 20080041211 A | 5/2008 |
| KR | 1020080041234 A | 5/2008 |
| KR | 1020080042852 A | 5/2008 |
| KR | 1020080072073 A | 8/2008 |
| KR | 101129221 B1 | 3/2012 |
| KR | 101130421 B1 | 3/2012 |
| KR | 101159334 B1 | 6/2012 |
| KR | 101161564 B1 | 7/2012 |
| KR | 101238559 B1 | 2/2013 |
| KR | 101298338 B1 | 8/2013 |

(56) References Cited

FOREIGN PATENT DOCUMENTS

| | | | |
|---|---|---|---|
| KR | 101298461 | B1 | 8/2013 |
| KR | 101312867 | B1 | 10/2013 |
| KR | 101323011 | B1 | 10/2013 |
| MX | 322458 | B | 3/2007 |
| MX | 323275 | B | 12/2009 |
| MX | 323276 | B | 12/2009 |
| MX | 315932 | B | 1/2010 |
| MY | 146456 | A | 8/2012 |
| MY | 149803 | A | 10/2013 |
| PH | 12005000404 | A1 | 4/2007 |
| PH | 12005000495 | A1 | 3/2014 |
| PH | 12008500356 | A1 | 8/2014 |
| RU | 2001122576 | A | 9/2003 |
| RU | 2242050 | C1 | 12/2004 |
| RU | 2005103645 | A | 7/2006 |
| RU | 2005116667 | A | 11/2006 |
| RU | 2005120362 | A | 1/2007 |
| RU | 2005130357 | A | 4/2007 |
| RU | 2322687 | C2 | 4/2008 |
| RU | 2327205 | C2 | 6/2008 |
| RU | 2328034 | C2 | 6/2008 |
| RU | 2537776 | C2 | 1/2015 |
| TW | 420953 | B | 2/2001 |
| TW | 200305097 | A | 10/2003 |
| TW | I254878 | B | 5/2006 |
| TW | 200814632 | A | 3/2008 |
| TW | I368852 | B | 7/2012 |
| TW | I389002 | B | 3/2013 |
| TW | I389043 | B | 3/2013 |
| TW | I401577 | B | 7/2013 |
| TW | I512591 | B | 12/2015 |
| WO | 9221091 | A1 | 11/1992 |
| WO | 9420921 | A1 | 9/1994 |
| WO | 9610231 | A1 | 4/1996 |
| WO | 9820410 | A1 | 5/1998 |
| WO | 9904353 | A1 | 1/1999 |
| WO | 9927495 | A1 | 6/1999 |
| WO | 0135216 | A2 | 5/2001 |
| WO | 0155894 | A2 | 8/2001 |
| WO | 2001055894 | A3 | 8/2001 |
| WO | 02091162 | A2 | 11/2002 |
| WO | 02091162 | A3 | 11/2002 |
| WO | 03003240 | A2 | 1/2003 |
| WO | 03098500 | A1 | 11/2003 |
| WO | 2004027672 | A1 | 4/2004 |
| WO | 2004056250 | A1 | 7/2004 |
| WO | 2005098701 | A2 | 10/2005 |
| WO | 2005103900 | A1 | 11/2005 |
| WO | 2007001636 | A2 | 1/2007 |
| WO | 2007027737 | A1 | 3/2007 |
| WO | 2007030696 | A2 | 3/2007 |
| WO | 2007033159 | A1 | 3/2007 |
| WO | 2007030727 | A3 | 5/2007 |
| WO | 2007064480 | A1 | 6/2007 |
| WO | 2008027477 | A2 | 3/2008 |
| WO | 2009158151 | A2 | 12/2009 |
| WO | 2009158171 | A2 | 12/2009 |
| WO | 2009158172 | A2 | 12/2009 |
| WO | 2009158172 | A3 | 2/2010 |
| WO | 2004027672 | A9 | 8/2014 |
| ZA | 201007809 | B | 2/2012 |
| ZA | 201007810 | B | 2/2012 |
| ZA | 201007875 | B | 2/2012 |
| ZA | 201104850 | B | 12/2012 |

OTHER PUBLICATIONS

U.S. Appl. No. 14/635,605, Notice of Allowance dated Aug. 25, 2017, 9 pages.
U.S. Appl. No. 14/635,605, Notice of Allowance dated Sep. 12, 2017, 2 pages.
U.S. Appl. No. 14/635,605, Notice of Allowance dated Dec. 1, 2017, 2 pages.
U.S. Appl. No. 14/981,404, Office Action dated Nov. 1, 2017, 16 pages.
Brazilian Office Action Issued in Patent Application No. PI0506116-4, dated Apr. 20, 2017, 5 Pages. (with English Summary).
European Search Report dated Feb. 28, 2012 cited in Appln No. 05107184.3; 8 pgs.
European Notice of Allowance in Application 05107184.3, dated Aug. 31, 2016, 7 pgs.
Chinese Decision on Reexamination dated Nov. 18, 2014 in Appln. No. 200910148820.4, 15 pgs.
Chinese Fifth Office Action dated Dec. 16, 2015 in Appln No. 200910148820.4, 6 pgs.
Chinese Fourth Office Action dated Aug. 3, 2015 in Appln No. 200910148820.4, 6 pgs.
Chinese Office Action dated Feb. 5, 2013 cited in Appln No. 200910148820.4, 5 pgs.
Chinese Office Action dated Nov. 18, 2011 cited in Appln. No. 200910148820.4; 10 pgs.
Chinese Second Office Action dated Jun. 18, 2012 in Appln No. 200910148820.4; 6 pgs.
Chinese Third Office Action dated Feb. 2, 2015 in Appln No. 200910148820.4, 12 pgs.
Chilean Notice of Allowance in Application 201101987, dated Mar. 30, 2016, 2 pgs; (w/o English translation).
European Notice of Allowance in Application 10744106.5, dated Nov. 9, 2017, 7 pages.
Office Action Issued in Mexican Patent Application No. MX/a/2011/008461, dated May 19, 2016, 10 Pages. (w/o English Translation).
Brazilian Office Action in Application PI0506081-8, dated Jun. 21, 2017, 7 pages.
Brazilian Office Action Issued in Brazil Patent Application No. PI0506081-8, dated Sep. 19, 2017, 5 Pages.
Thailand Office Action in Application 0501003163, dated Aug. 22, 2017, 3 pgs.
"Notice of Allowance Issued in Korean Patent Application No. 10-2016-7024123", dated Feb. 28, 2018, 3 Pages.
"Final Office Action Issued in U.S. Appl. No. 10/836,154", dated Jan. 28, 2008, 18 Pages.
"Final Office Action Issued in U.S. Appl. No. 10/836,154", dated Sep. 27, 2010, 13 Pages.
"Final Office Action Issued in U.S. Appl. No. 10/836,154", dated Nov. 2, 2011, 19 Pages.
"Non-Final Office Action Issued in U.S. Appl. No. 10/836,154", dated Jun. 14, 2007, 15 Pages.
"Non-Final Office Action Issued in U.S. Appl. No. 10/836,154", dated May 5, 2011, 18 Pages.
"Non-Final Office Action Issued in U.S. Appl. No. 10/836,154", dated Aug. 7, 2012, 20 Pages.
"Non-Final Office Action Issued in U.S. Appl. No. 10/848,774", dated Feb. 20, 2008, 26 Pages.
"Non-Final Office Action Issued in U.S. Appl. No. 10/851,442", dated Feb. 21, 2008, 16 Pages.
"Final Office Action Issued in U.S. Appl. No. 10/851,506", dated Dec. 21, 2007, 13 Pages.
"Final Office Action Issued in U.S. Appl. No. 10/851,506", dated May 5, 2010, 14 Pages.
"Final Office Action Issued in U.S. Appl. No. 10/851,506", dated May 19, 2011, 16 Pages.
"Non- Final Office Action Issued in U.S. Appl. No. 10/851,506", dated Apr. 12, 2007, 15 Pages.
"Non-Final Office Action Issued in U.S. Appl. No. 10/851,506", dated Dec. 8, 2010, 17 Pages.
"Non-Final Office Action Issued in U.S. Appl. No. 10/851,506", dated Jun. 19, 2008, 14 Pages.
"Non- Final Office Action Issued in U.S. Appl. No. 10/851,506", dated Dec. 12, 2012, 18 Pages.
"Final Office Action Issued in U.S. Appl. No. 10/851,506", dated Apr. 18, 2013, 17 Pages.
"Non-Final Office Action Issued in U.S. Appl. No. 10/851,506", dated Aug. 19, 2013, 15 Pages.
"Final Office Action Issued in U.S. Appl. No. 10/851,506", dated Dec. 6, 2013, 15 Pages.

(56) References Cited

OTHER PUBLICATIONS

"Final Office Action Issued in U.S. Appl. No. 10/955,928", dated Jan. 8, 2008, 20 Pages.
"Non- Final Office Action Issued in U.S. Appl. No. 10/955,928", dated Jun. 20, 2008, 21 Pages.
"Non-Final Office Action Issued in U.S. Appl. No. 10/955,928", dated Jun. 21, 2007, 20 Pages.
"Final Office Action Issued in U.S. Appl. No. 10/955,940", dated Dec. 4, 2007, 16 Pages.
"Final Office Action Issued in U.S. Appl. No. 10/955,940", dated Apr. 7, 2009, 16 Pages.
"Final Office Action Issued in U.S. Appl. No. 10/955,940", dated Jun. 23, 2010, 15 Pages.
"Non-Final Office Action Issued in U.S. Appl. No. 10/955,940", dated Dec. 10, 2009, 15 Pages.
"Non-Final Office Action Issued in U.S. Appl. No. 10/955,940", dated Jul. 17, 2008, 18 Pages.
"Non-Final Office Action Issued in U.S. Appl. No. 10/955,940", dated Jun. 4, 2007, 20 Pages.
"Office Action Issued in Philippines Patent Application No. PH/1/2005/404", dated Jan. 23, 2006, 1 Page.
"Notice of Allowance Issued in U.S. Appl. No. 10/955,941", dated May 14, 2009, 10 Pages.
"Notice of Allowance Issued in U.S. Appl. No. 10/955,941", dated Aug. 21, 2009, 10 Pages.
"Notice of Allowance Issued in U.S. Appl. No. 10/955,941", dated Oct. 30, 2009, 7 Pages.
"Notice of Allowance Issued in U.S. Appl. No. 10/955,941", dated Feb. 17, 2010, 8 Pages.
"Final Office Action Issued in U.S. Appl. No. 10/955,942", dated Apr. 15, 2008, 14 Pages.
"Final Office Action Issued in U.S. Appl. No. 10/955,942", dated Aug. 4, 2009, 19 Pages.
"Final Office Action Issued in U.S. Appl. No. 10/955,942", dated Aug. 2, 2010, 19 Pages.
"Non-Final Office Action Issued in U.S. Appl. No. 10/955,942", dated Feb. 19, 2010, 19 Pages.
"Non-Final Office Action Issued in U.S. Appl. No. 10/955,942", dated Dec. 23, 2008, 23 Pages.
"Non-Final Office Action Issued in U.S. Appl. No. 10/955,942", dated Jul. 11, 2007, 18 Pages.
"Notice of Allowance Issued in U.S. Appl. No. 10/955,942", dated Dec. 3, 2010, 13 Pages.
"Notice of Allowance Issued in U.S. Appl. No. 10/955,942", dated Jan. 11, 2011, 10 Pages.
"Notice of Allowance Issued in U.S. Appl. No. 10/955,942", dated Mar. 15, 2011, 8 Pages.
"Notice of Allowance Issued in U.S. Appl. No. 10/955,942", dated Jun. 23, 2011, 17 Pages.
"Notice of Allowance Issued in U.S. Appl. No. 10/955,942", dated Oct. 14, 2011, 7 Pages.
"International Search Report & Written Opinion Issued in PCT Application No. PCT/US2011/037458", dated Feb. 9, 2012, 5 Pages.
"International Search Report & Written Opinion for PCT Patent Application No. PCT/US2010/034277", dated Nov. 29, 2010, 10 Pages.
"Notice of Allowance Issued in U.S. Appl. No. 10/955,967", dated Apr. 10, 2012, 23 Pages.
"Final Office Action Issued in U.S. Appl. No. 10/982,073", dated Jun. 8, 2009, 11 Pages.
"Final Office Action Issued in U.S. Appl. No. 10/982,073", dated May 28, 2008, 10 Pages.
"Non-Final Office Action Issued in U.S. Appl. No. 10/982,073", dated Oct. 9, 2007, 10 Pages.
"Non-Final Office Action Issued in U.S. Appl. No. 10/982,073", dated Dec. 11, 2008, 11 Pages.
"Final Office Action Issued in U.S. Appl. No. 13/437,031", dated Jun. 17, 2015, 12 Pages.
"Final Office Action Issued in U.S. Appl. No. 13/437,031", dated Feb. 23, 2018., 9 Pages.
"Non-Final Office Action Issued in U.S. Appl. No. 13/464,572", dated Aug. 25, 2014, 16 Pages.
"Notice of Allowance Issued in U.S. Appl. No. 13/464,572", dated Mar. 19, 2015, 21 Pages.
"Notice of Allowance Issued in U.S. Appl. No. 13/595,084", dated Oct. 19, 2015, 2 Pages.
"Notice of Allowance Issued in U.S. Appl. No. 13/595,084", dated Dec. 2, 2015, 2 Pages.
"Notice of Allowance Issued in U.S. Appl. No. 13/595,084", dated Jul. 28, 2015, 15 Pages.
"Amendment and Response Filed in U.S. Appl. No. 13/615,668", filed Jun. 2, 2016, 12 Pages.
Alexander, Zubair, "Keeping New Messages Marked Unread", Retrieved from <<http://certcities.com/editorial/colums/story.asp?EditorialsD=243>>, Oct. 3, 2007, 2 Pages.
"Response to Amendment Under Rule 312 Issued in U.S. Appl. No. 13/615,668", dated May 16, 2017, 2 Pages.
"Final Office Action Issued in U.S. Appl. No. 13/769,598", dated Jun. 2, 2014, 12 Pages.
"Non-Final Office Action Issued in U.S. Appl. No. 13/769,598", dated Nov. 29, 2013, 11 Pages.
"Notice of Allowance Issued in U.S. Appl. No. 13/769,598", dated Nov. 20, 2015, 14 Pages.
"Final Office Action Issued in U.S. Appl. No. 13/769,598", dated Jun. 24, 2015, 20 Pages.
"Non-Final Office Action Issued in U.S. Appl. No. 13/769,598", dated Feb. 24, 2015, 15 Pages.
"Office Action Issued in Malaysian Patent Application No. PI 20053260", dated Oct. 31, 2012, 2 Pages.
"Non-Final Office Action Issued in U.S. Appl. No. 13/925,523", dated Aug. 2, 2016, 7 Pages.
"Notice of Allowance Issued in U.S. Appl. No. 13/925,523", dated Dec. 6, 2016, 5 Pages.
"Corrected Notice of Allowance Issued in U.S. Appl. No. 14/032,094", dated Apr. 18, 2016, 2 Pages.
"Ex Parte Quayle Action Issued in U.S. Appl. No. 14/032,094", filed Oct. 23, 2015, 9 Pages.
"Response to Amendment Under Rule 312 Issued in U.S. Appl. No. 14/032,094", dated Apr. 14, 2017, 2 Pages.
"Non-Final Office Action Issued in U.S. Appl. No. 14/142,132", dated Jan. 29, 2016, 25 Pages.
"Notice of Allowance Issued in U.S. Appl. No. 14/142,132", dated Aug. 3, 2016, 17 pages.
"Notice of Allowance Issued in U.S. Appl. No. 14/150,531", dated Nov. 29, 2016, 5 Pages.
"Notice of Allowance Issued in U.S. Appl. No. 14/150,531", dated Feb. 17, 2017, 5 Pages.
"Notice of Allowance Issued in U.S. Appl. No. 14/150,531", dated Jul. 7, 2017, 2 Pages.
"Notice of Allowance Issued in U.S. Appl. No. 14/150,531", dated Apr. 19, 2017, 2 Pages.
"Non-Final Office Action Issued in U.S. Appl. No. 14/150,531", dated Jun. 19, 2015, 20 Pages.
"Final Office Action Issued in U.S. Appl. No. 14/150,531", dated Nov. 10, 2015, 25 Pages.
"Non-Final Office Action Issued in U.S. Appl. No. 14/150,531", dated May 20, 2016, 22 Pages.
"Response to Amendment Under Rule 312 Issued in U.S. Appl. No. 14/150,531", dated May 26, 2017, 1 Pages.
"Amendment and Response Filed in U.S. Appl. No. 14/226,421", filed Aug. 5, 2016, 8 pages.
"Non-Final Office Action Issued in U.S. Appl. No. 14/226,421", dated Nov. 2, 2017, 8 Pages.
"Notice of Allowance Issued in U.S. Appl. No. 14/226,421", dated Jul. 6, 2017, 8 Pages.
"Notice of Allowance Issued in U.S. Appl. No. 14/226,421", dated Nov. 30, 2016, 8 Pages.
"Notice of Allowance Issued in U.S. Appl. No. 14/226,421", dated Mar. 13, 2017, 8 Pages.
"Notice of Allowance Issued in U.S. Appl. No. 14/226,421", dated Aug. 31, 2016, 7 Pages.

(56) References Cited

OTHER PUBLICATIONS

"Non-Final Office Action Issued in U.S. Appl. No. 14/226,421", dated May 6, 2016, 18 Pages.
"Notice of Allowance Issued in U.S. Appl. No. 14/665,112", dated Sep. 8, 2017, 16 Pages.
"Response to Amendment Under Rule 312 Issued in U.S. Appl. No. 14/665,112", dated Oct. 4, 2017, 2 Pages.
"Non-Final Office Action Issued in U.S. Appl. No. 14/816,844", dated Dec. 5, 2017, 27 Pages.
"Non-Final Office Action Issued in U.S. Appl. No. 14/841,698", dated Dec. 4, 2017, 29 Pages.
"Office Action Issued in Chile Patent Application 1559-2010", dated Nov. 21, 2012, 6 Pages.(W/o English Translation).
"Office Action Issued in Chile Patent Application 1559-2010", dated Mar. 29, 2012, 7 Pages.
"Office Action Issued in Chilean Patent Application No. 1560-2010", dated Sep. 21, 2012, 8 Pages.
"Office Action Issued in Indian Patent Application No. 1568/DEL/2005", dated Feb. 17, 2015, 3 Pages.
"Office Action Issued in Israel Patent Application No. 1611334", dated Oct. 17, 2013, 4 Pages.
"Office Action Issued in Israel Patent Application No. 169717", dated Aug. 29, 2012, 4 Pages.
"Office Action Issued in Israel Patent Application No. 169717", dated Oct. 26, 2009, 2 Pages.
"Office Action Issued in Norweign Patent Application No. 20053655", dated Mar. 2, 2016, 3 Pages.
"Notice of Allowance Issued in Norweign Patent Application No. 20053656", dated Jun. 22, 2015, 2 Pages.(W/o English Translation).
"Office Action Issued in Norweign Patent Application No. 20053656", dated Feb. 22, 2014, 5 Pages.
"Office Action Issued in Norweign Patent Application No. 20053656", dated Nov. 19, 2014, 2 Pages.
"Notice of Allowance Issued in Norweign Patent Application No. 20053658", dated Jun. 3, 2016, 02 Pages.
"Office Action Issued in Norweign Patent Application No. 20053658", dated Feb. 11, 2014, 4 Pages.
Bkonia, "Reading Pane in Conversation View", Retrieved from <<https://forums.zimbra.org/viewtopic.php?t=32371>>, Dec. 2006, 5 Pages.
"Office Action Issued in Norweign Patent Application No. 20053658", dated Nov. 29, 2014, 4 Pages.
"Office Action Issued in Norweign Patent Application No. 20054097", dated Jan. 15, 2016, 1 Page.
"Office Action Issued in Australian Patent Application 2006284908", dated Oct. 21, 2010, 2 Pages.
"Office Action Issued in Australian Patent Application No. 2006287408", dated Jan. 17, 2011, 2 Pages.
"Office Action Issued in Chinese Patent Application No. 200680018095.3", dated Jul. 3, 2009, 14 Pages.
"Office Action Issued in Chinese Patent Application No. 2006800180953", dated Apr. 27, 2012, 8 Pages.
"Office Action Issued in Chinese Patent Application 2006800180953", dated Jul. 31, 2012, 17 Pages.
"Office Action Issued in Chinese Patent Application No. 200680018095.3", dated Dec. 5, 2011, 6 Pages.
Berliner, et al., "Viewing a document in the Microsoft Office 2003 application window", Microsoft Office 2003, Feb. 24, 2004, 23 Pages.
"Office Action Issued in Chinese Patent Application No. 200680030421.2", dated Oct. 18, 2010, 11 Pages.
"Office Action Issued in Chinese Patent Application No. 200680030421.2", dated Jun. 21, 2011, 8 Pages.
"Office Action Issued in Chinese Patent Application No. 200680032564.7", dated Jan. 22, 2010, 7 Pages.
"Office Action Issued in Chinese Patent Application No. 200680032789.2", dated Nov. 11, 2010, 11 Pages.
"Notice of Allowance Issued in Chinese Patent Application No. 200680032789.2", dated May 15, 2014, 4 Pages.
"Office Action Issued in Chinese Patent Application No. 200680032789.2", dated Apr. 7, 2011, 9 Pages.
"Office Action Issued in Chinese Patent Application No. 200680032789.2", dated Dec. 4, 2013, 6 Pages.
"Office Action Issued in Chinese Patent Application No. 200680033212.3", dated Nov. 27, 2009, 8 Pages.
"Office Action Issued in Chinese Patent Application No. 200680033212.3", dated Jul. 6, 2010, 6 Pages.
"Office Action Issued in Chinese Patent Application No. 200680033212.3", dated Feb. 10, 2011, 7 Pages.
"Office Action Issued in Chinese Patent Application No. 20068032789.2", dated Jul. 21, 2011, 11 Pages.
"Notice of Allowance Issued in Australian Patent Application No. 2007255043", dated Apr. 4, 2012, 3 Pages.
"Office Action Issued in Australian Patent Application No. 2007255043", dated Aug. 31, 2011, 3 Pages.
"Office Action Issued in Chinese Patent Application No. 200780020312.7", dated Mar. 7, 2012, 5 Pages.
"Office Action Issued in Chinese Patent Application No. 200780020312.7", dated Mar. 11, 2010, 8 Pages.
"Office Action Issued in Chinese Patent Application No. 200780020312.7", dated Feb. 15, 2015, 9 Pages.
"Notice of Allowance Issued in Chinese Application No. 2007800203121", dated Jul. 2, 2015, 4 Pages.
"Office Action Issued in Chinese Patent Application No. 200780020312.7", dated May 19, 2011, 9 Pages.
"Office Action Issued in Chinese Patent Application No. 200780020312.7", dated Aug. 12, 2014, 13 Pages.
"Office Action Issued in Russian Patent Application No. 2008109034/08", dated Jul. 26, 2010, 8 Pages.
"Office Action Issued in Russian Patent Application No. 2008109034/08", dated Nov. 12, 2010, 8 Pages.
"Notice of Allowance Issued in Russian Patent Application No. 2008147090", dated Aug. 16, 2011, 15 Pages.
"Office Action Issued in Russian Patent Application No. 2008147090", dated Jun. 14, 2011, 2 Pages.
"Office Action Issued in Japanese Patent Application No. 2008-513476", dated Nov. 4, 2011, 4 Pages.
"Office Action Issued in Japanese Patent Application No. 2008-513476", dated Mar. 9, 2012, 4 Pages.
"Office Action Issued in Japanese Patent Application No. 2008-529218", dated Dec. 16, 2011, 6 Pages.
"Office Action Issued in Japanese Patent Application No. 2008-530218", dated Feb. 3, 2012, 6 Pages.
"Notice of Allowance Issued in Japanese Patent Application 2008-530229", dated Apr. 13, 2012, 6 Pages.
Berliner, et al., "Using the Insert menu. Inserting and formatting a picture in Word", Microsoft Office 2003, Feb. 24, 2004, 13 Pages.
"Office Action Issued in Japanese patent Application No. 2008-530229", dated Nov. 11, 2011, 4 Pages.
"Office Action Issued in Japanese Patent Application No. 2008-530229", dated Jun. 10, 2011, 4 Pages.
"Office Action Issued in Japanese Patent Application No. 2008-531249", dated Nov. 25, 2011, 8 Pages.
"Notice of Allowance Issued in Chinese patent Application No. 200910148820.4", dated May 6, 2016, 4 Pages.
"Decision on Re-examination Issued in Chinese Patent Application No. 200910148820.4", dated Oct. 30, 2014, 14 Pages.
"Office Action Issued in Israel Patent Application No. 169718", dated May 3, 2012, 4 Pages.
"Office Action Issued in Israel Patent Application No. 169718", dated Jul. 5, 2010, 3 Pages.
"Office Action Issued in Israel Patent Application No. 169718", dated Oct. 17, 2013, 4 Pages.
"Office Action Issued in Israeli Patent Application No. 169718", dated Sep. 7, 2009, 2 Pages.
"Office Action Issued in Israel Patent Application No. 170668", dated Oct. 12, 2009, 2 Pages.
"Office Action Issued in Israel Patent Application No. 170668", dated Feb. 23, 2012, 20 Pages.
"Office Action Issued in Israel Patent Application No. 170668", dated Jun. 18, 2013, 4 Pages.

(56) References Cited

OTHER PUBLICATIONS

"Fourth Official Notice Issued in Japan, Mailing No. 134052, Patent Application No. PH1707009", dated Sep. 20, 2011, 2 Pages.
"Third Official Notice Issued in Japan, Mailing No. 134028, Patent Application No. PH1707009", dated Sep. 20, 2011, 2 Pages.
Aoyagi, Hideo, "Mail Mac Fan Special 33", Manichi Communications Inc., Mar. 1, 2004, 5 Pages.
"Second Office Action Issued in Chilean Patent Application No. 1769-2005", dated Jan. 29, 2010, 14 Pages.
"Office Action Issued in Chilean Patent Application 1770-2005", dated Mar. 13, 2009, 10 Pages.
"Office Action Issued in Chilean Patent Application 1770-2005", dated Feb. 9, 2010, 7 pages.(W/o English Translation).
"Office Action Issued in Indian Patent Application No. 1817/DEL/2005", dated Mar. 30, 2012, 2 Pages.
"Office Action Issued in Indian Patent Application No. 1819/DEL/2005", dated Dec. 23, 2014, 2 Pages.
"Office Action Issued in Israel Patent Application No. 189293", dated Jun. 3, 2012, 4 Pages.
"Office Action Issued in Israel Patent Application No. 194785", dated Mar. 6, 2014, 5 Pages.
"Office Action Issued in Israel Patent Application No. 194785", dated Feb. 28, 2012, 4 Pages.
"Office Action Issued in India Patent Application No. 1979/DELNP/2008", dated May 6, 2015, 2 Pages.
"Office Action Issued in Chilean Patent Application No. 1987-2011", dated Jun. 6, 2014, 12 Pages.
"Office Action Issued in Canadian Patent Application No. 2,511,101", dated Nov. 29, 2012, 3 Pages.
"Office Action Issued in Canadian Patent Application No. 2,511,101", dated Jan. 28, 2014, 4 Pages.
"Office Action Issued in Canadian Application No. 2,512,036", dated Nov. 29, 2012, 2 Pages.
"Notice of Allowance Issued in Canadian Patent Application No. 2,512,036", dated Jun. 2, 2015, 1 Page.
"Office Action Issued in Canadian Patent Application No. 2,512,036", dated Sep. 4, 2014, 3 Pages.
"Office Action Issued in Canadian Patent Application No. 2,512,036", dated Sep. 18, 2013, 3 Pages.
"Office Action Issued in Canadian Patent Application No. 2,512,047", dated Oct. 30, 2013, 3 Pages.
"Office Action Issued in Canadian Patent Application No. 2,512,102", dated Nov. 23, 2012, 5 Pages.
"Office Action Issued in Canadian Patent Application No. 2,512,102", dated Jul. 30, 2014, 7 Pages.
"Office Action received for Canadian Patent Application No. 2,512,102", dated Nov. 15, 2013, 3 Pages.
"Office Action Issued in Canadian Application No. 2,512,155", dated Jan. 18, 2013, 6 Pages.
"Notice of Allowance Issued in Canada Patent Application No. 2,512,155", dated May 16, 2017, 1 Page.
Anantharaman, Vinod, "Windows 95 Common Controls", In Dr. Dobb's Journal, May 1, 1995, 12 Pages.
"Office Action Issued in Canadian Patent Application No. 2,617,182", dated Sep. 30, 2014, 3 Pages.
"Office Action Issued in Canadian Patent Application No. 2,618,169", dated Dec. 5, 2013, 3 Pages.
"Office Action Issued in Canadian Patent Application No. 2,618,169", dated May 26, 2015, 4 Pages.
"Office Action Issued in Canadian Patent Application No. 2,650,016", dated Oct. 7, 2013, 2 Pages.
"Office Action Issued in Canadian Patent Application No. 2,724,201", dated Aug. 3, 2015, 5 Pages.
"Office Action Issued in Canadian Patent Application No. 2,724,681", dated Oct. 16, 2015, 7 Pages.
"Office Action Issued in Canadian Patent Application No. 2,725,046", dated Jul. 14, 2015, 5 Pages.
"Notice of Allowance Issued in Canada Patent Application No. 2,848,667", dated Oct. 6, 2015, 1 Page.
"Office Action Issued in Canadian Application No. 2,848,700", dated Oct. 15, 2015, 4 Pages.
"Office Action Issued in Canadian Patent Application No. 2,848,700", dated Jan. 26, 2017, 4 Pages.
"Office Action Issued in Mexican Patent Application No. PA/a/2005/008354", dated Aug. 12, 2010, 10 Pages.
"Notice of Allowance Issued in Chile Patent Application No. 200501768", dated Aug. 24, 2016, 2 Pages.(W/o English Translation).
"Office Action Issued in Chile Patent Application No. 200501769", dated Sep. 2, 2016, 2 Pages.(W/o English Translation).
"Office Action Issued in Chilean Patent Application No. 200501770", dated May 27, 2008, 2 Pages.
"Office Action Issued in Chilean Patent Application No. 200501770", dated Mar. 11, 2009, 10 Pages.
"Notice of Allowance Issued in Singapore Patent Application No. 200504474-8", dated Feb. 15, 2008, 3 Pages.
"Office Action and Search Report Issued in Singapore Application No. 200504474-8", dated Jan. 16, 2007, 8 Pages.
Ringel, Meredith, "Automated Message Prioritization: Making Voicemail Retrieval More Efficient", In Conference on Human Factors in Computer Science, Apr. 20, 2002, 2 Pages.
Russel, et al., "Special Edition Using Microsoft® Office Outlook® 2003", Que Publisher, Sep. 25, 2003, 71 Pages.
Sada, Morihiro, "Clue for Managing Common Data Filed on Server", Business Personal Computer Age, Dempa Publications, Inc, vol. 15, Issue 7, Jul. 1, 1997, 1 Page.
Schwartz, Steve, "Microsoft Office 2007 for Windows: Visual QuickStart Guide", Peachpit Press, May 31, 2007, 11 Pages.
Seo, et al., "Hangul Office 2000 Tutoring Book", Sep. 15, 2000, 16 Pages.
Shinder, Deb,, "Locate and organize e-mail messages with Outlook 2003 search folders", Retrieved From <<http://www.techrepublic.com/article/locate-and-organize-e-mail-messages-with-outlook-2003-search-folders/>>, Aug. 5, 2004, 12 Pages.
Smolin, Andrei, "Create Office Add-ins: Ribbons, Toolbars, Taskpanes, Menus etc.", Retrieved from <<https://www.add-in-express.com/creating-addins-blog/2007/07/04/create-office-addins-ribbons-toolbars-task-panes-menus/>>, Jul. 4, 2007, 49 Pages.
Venolia, et al., "Supporting Email Workflow", In Microsoft Research Technical Report MSR-TR-2001-88, Sep. 1, 2001, 11 Pages.
Walther, Henrik,, "Using Search Folders in Outlook 2003", Retrieved From <<http://www.outlookexchange.com/articles/henrikwalther/using_search_folders_in_outlook_2003.asp>>, Jan. 2004, 5 Pages.
Whitechapel, Andrew, "Microsoft Visual Studio 2005 Tools for the 2007 Microsoft Office System Beta Tutorial", Retrieved from <<http://download.microsoft.com/download/3/2/d/32db7049-bc04-4c79-a91b-7f62eaae754a/VSTO2005SE_Tutorial.doc>>, Sep. 2006, 19 Pages.
Woody, et al., "Saving Time with Google", In Book-Windows XP Time saving Techniques for Dummies, Wiley Publishing Inc, Jan. 13, 2005, pp. 229-238.
Yang, et al., "Email Categorization Using Fast Machine Learning Algorithms", In Proceedings of the 5th International Conference on Discovery Science, Nov. 24, 2002, pp. 316-323.
Yaser, "Microsoft Office Word 2003", Retrieved from <<http://www.just.edu.jo/~yaser/courses/cs98/slides/Microsoft%20Office%20Word%202003.ppt>>, 2003, 49 Pages.
Zweben, et al., "Scheduling and Rescheduling with Iterative Repair", In Proceedings of IEEE Transactions on Systems, Man, and Cybernetics, Nov. 23, 1993, 9 Pages.
"Office Action Issued in Indian Patent Application No. 06296/CHENP/2008", dated Jul. 13, 2016, 9 Pages.
"Notice of Allowance Issued in Malaysian Patent Application No. PI 20080400", dated Sep. 13, 2013, 2 Pages.
"Office Action Issued in Mexican Patent Application No. MX/a/2008/002889", dated Feb. 3, 2012, 12 Pages.
"Office Action Issued in Mexican Patent Application No. MX/a/2008/003342", dated Jan. 10, 2013, 8 Pages.
"Notice of Allowance Issued in Mexican Patent Application No. MX/a/2008/002889", dated Mar. 11, 2014, 1 Page. (W/O English Translation).

(56) References Cited

OTHER PUBLICATIONS

"Office Action Issued in Mexican Patent Application No. MX/a/2008/014849", dated Sep. 12, 2012, 8 Pages.
"Office Action Issued in Mexican Patent Application No. MX/a/2008/014849", dated May 14, 2013, 9 Pages.
"Office Action Issued in Mexican Patent Application No. MX/a/2008/014849", dated Jan. 25, 2012, 8 Pages.
"Office Action Issued in Mexican Patent Application No. MX/a/2008/014849", dated Jun. 21, 2011, 10 Pages.
"Office Action Issued in Mexican Patent Application No. MX/a/2009/004151", dated May 26, 2011, 4 Pages.
Murray, Katherine, "First Look 2007 Microsoft Office System", Published by Microsoft Press, Jun. 21, 2006, 16 Pages.
"Office Action Issued in Mexican Patent Application No. MX/a/2010/013566", dated Jun. 12, 2013, 8 Pages.
"Office Action Issued in Mexican Patent Application No. MX/a/2010/014056", dated Feb. 3, 2013, 6 Pages.
"Notice of Allowance Issued in Mexican Patent Application No. MX/a/2011/008461", dated Feb. 3, 2017, 2 Pages.
"Office Action Issued in Mexican Patent Application No. MX/a/2011/011749", dated Aug. 2, 2013, 6 Pages.
"Office Action Issued in Mexican Patent Application No. MX/a/2008/003342", dated Sep. 22, 2011, 10 Pages.(W/o English Translation).
Ohmori, et al., "Eigyo Mind—A Sales Support Tool", In PFU Tech. Rev., vol. 10, Issue 1, May 1, 1999, 33 Pages.
"Office Action Issued in Mexican Patent Application No. PA/a/2005/007073", dated Jun. 19, 2009, 6 Pages.
"Mexican Office Action Received for Mexican Patent Application No. PA/a/2005/008349", dated Mar. 14, 2014, 12 Pages.
"Notice of Allowance Issued in Mexican Patent Application No. PA/a/2005/008349", dated Dec. 16, 2014, 2 Pages.(W/o English Translation).
"Office Action Issued in Mexican Patent Application No. PA/a/2005/008349", dated Dec. 3, 2009, 5 Pages.
"Office Action Issued in Mexican Patent Application No. PA/a/2005/008350", dated Dec. 4, 2009, 4 Pages.
"Office Action Issued in Mexican Patent Application No. PA/a/2005/008350", dated Mar. 22, 2013, 28 Pages.
Morita, Utako, "Literature Searching System, JDream", In Online Search, The Society of Japan Terminal, vol. 23, Issue 4, Dec. 2002, 5 Pages.
"Office Action Issued in Mexican Patent Application No. PA/a/2005/008350", dated Mar. 31, 2011, 38 Pages.
"Office Action Issued in Mexican Patent Application No. PA/a/2005/008351", dated Mar. 26, 2013, 31 Pages.
"Office Action Issued in Mexican Patent Application No. PA/a/2005/008351", dated Dec. 1, 2009, 4 Pages.
"Office Action Issued in Mexican Patent Application No. PA/a/2005/008354", dated Apr. 24, 2012, 25 Pages.
"Office Action Issued in Mexican Patent Application No. PA/a/2005/008354", dated May 4, 2010, 7 Pages.
"Office Action Issued in Mexican Patent Application No. PA/a/2005/008354", dated Jan. 6, 2011, 26 Pages.
"International Search Report & Written Opinion Issued in PCT Application No. PCT/US09/34618", dated Aug. 7, 2009, 12 Pages.
"International Search Report and Written Opinion Issued in PCT Application No. PCT/US2006/012724", dated Oct. 17, 2007, 11 Pages.
"Search Report Issued in European Patent Application No. 067405753", dated Apr. 18, 2013, 12 Pages.
"International Search Report and Written Opinion Issued in PCT Application No. PCT/US2006/033809", dated Jan. 9, 2007, 9 Pages.
"International Search Report and Written Opinion Issued in PCT Application No. PCT/US2006/034993", dated Feb. 26, 2007, 11 Pages.
"International Search Report and Written Opinion Issued in PCT Application No. PCT/US2006/035467", dated Feb. 6, 2007, 10 Pages.

"Office Action Issued in Australian Patent Application 2009260596", dated Mar. 4, 2014, 4 Pages.
"Notice of Allowance Issued in Australian Patent Application No. 2009262833", dated Apr. 16, 2014, 2 Pages.
"Office Action Issued in Australian Patent Application No. 2009262833", dated Feb. 28, 2014, 3 Pages.
"Office Action Issued in Australian Patent Application No. 2009262834", dated Feb. 28, 2014, 3 Pages.
"Office Action Issued in Australian Patent Application No. 2009271517", dated Mar. 4, 2014, 3 Pages.
"Office Action Issued in Australian Patent Application No. 2009271517", dated Apr. 29, 2014, 3 Pages.
"Notice of Allowance Issued in Japanese Patent Application No. 2009-513223", dated Dec. 28, 2012, 6 Pages.
"Office Action Issued in Japanese Patent Application No. 2009-513223", dated May 11, 2012, 6 Pages.
"Notice of Allowance Issued in Chinese Patent Application No. 200980112454.5", dated Aug. 13, 2014, 4 Pages.
"Office Action Issued in Chinese Patent Application No. 200980124383.0", dated Nov. 29, 2011, 9 Pages.
"Second Office Action Issued in Chinese Patent Application No. 200980124383.0", dated Mar. 9, 2012, 10 Pages.
"Office Action Issued in Chinese Patent Application No. 200980124383.0", dated Aug. 14, 2012, 6 Pages.
"Office Action Issued in China Patent Application No. 200980124644.9", dated Jan. 13, 2014, 9 Pages.
"Office Action Issued in Chinese Patent Application 200980124644.9", dated Jul. 8, 2015, 8 Pages.
"Office Action Issued in Chinese Patent Application No. 200980124644.9", dated Dec. 17, 2012, 10 pages.
"Office Action Issued in Chinese Patent Application No. 200980124644.9", dated Jun. 5, 2013, 10 Pages.
"Office Action Issued in Chinese Application No. 200980124664.9", dated Feb. 29, 2012, 9 Pages.
"Office Action Issued in Chinese Application No. 200980124944.7", dated Sep. 12, 2012, 13 Pages.
"Office Action Issued in Chinese Application No. 200980124944.7", dated Dec. 31, 2012, 14 Pages.
"Office Action Issued in Chinese Patent Application No. 200980124944.7", dated Jul. 2, 2012, 8 Pages.
"Office Action Issued in Chinese Patent Application No. 200980124944.7", dated Apr. 23, 2013, 7 pages.
"Office Action Issued in Chinese Patent Application No. 200980124945.1", dated Aug. 2, 2012, 8 Pages.
"Notice of Allowance Issued in Chinese Patent Application No. 200980124945.1", dated Jun. 26, 2013, 4 Pages.
"Office Action Issued in Chinese Patent Application 200980124945.1", dated Dec. 31, 2012, 8 Pages.
Miser, Brad, "Special Edition Using Mac OS X v10.2", In Que Publishing, Jan. 3, 2003, 6 Pages.
"Notice of Allowance Issued in Russian Patent Application No. 2010138162", dated Jul. 16, 2014, 21 Pages.
"Office Action Issued in Russian Patent Application No. 2010140069", dated Dec. 7, 2012, 8 Pages.
"Office Action Issued in Russian Patent Application No. 2010140069", dated Aug. 15, 2013, 3 Pages.(W/o English Translation).
"Notice of Allowance Issued in Russian Patent Application No. 2010151922", dated Aug. 14, 2013, 18 Pages.
"Office Action Issued in Russian Patent Application No. 2010151922", dated May 13, 2013, 7 Pages.
Chamberland, et al., "IBM Visual Age for Java", IBM Systems Journal, vol. 37, No. 3, Jul. 1, 1998, 26 Pages.
"Notice of Allowance Issued in Russian Patent Application No. 2010152843", dated Feb. 20, 2014, 16 Pages.
"Notice of Allowance Issued in Russian Patent Application No. 2010153223", dated May 23, 2013, 20 Pages.
"Office Action Issued in Australian Patent Application No. 2010216342", dated Mar. 14, 2014, 3 Pages.
"Notice of Allowance Issued in Australian Patent Application No. 2010216342", dated Jun. 25, 2014, 2 Pages.
"Office Action Issued in Australian Patent Application 2010247882", dated Apr. 30, 2014, 3 Pages.

(56) References Cited

OTHER PUBLICATIONS

"Office Action Issued in Chinese Application No. 201080008789.5", dated Jan. 4, 2013, 8 Pages.
"Office Action Issued in Chinese Patent Application No. 201080008789.5", dated Jul. 12, 2012, 8 Pages.
"Notice of Allowance Issued in Chinese Patent Application No. 201080008789.5", dated Apr. 16, 2013, 6 Pages.
"Office Action Issued in Chinese Patent Application No. 201080021957.4", dated Jan. 6, 2013, 9 Pages.
"Office Action Issued in Chinese Patent Application No. 201080021957.4", dated Aug. 5, 2013, 12 Pages.
"Office Action Issued in Chinese Patent Application No. 201080021957.4", dated Apr. 3, 2014, 6 Pages.
"Office Action Issued in Chilean Patent Application No. 201101987", dated Jun. 3, 2014, 12 Pages.
"Office Action Issued in Chilean Patent Application No. 201101987", dated Jul. 29, 2013, 12 Pages.
"Notice of Allowance Issued in Russian Patent Application No. 2011134380", dated Feb. 27, 2014, 22 Pages.
"Notice of Allowance Issued in Russian Patent Application 2011145984", dated: May 20, 2014, 24 Pages.
"Office Action Issued in Japanese Patent Application No. 2011-514652", dated Mar. 19, 2013, 6 Pages.
"Office Action Issued in Japanese Patent Application 2011-516371", dated Mar. 12, 2013, 4 Pages.
"Notice of Allowance Issued in Japanese Patent Application No. 2011-516400", dated Apr. 2, 2013, 6 Pages.
"Notice of Acceptance Issued in South African Patent Application No. 2012/06052", dated Mar. 11, 2013, 1 Page.
"Office Action and Search Report received for Chinese Patent Application No. 201210079579.6", dated Sep. 15, 2014, 11 Pages.
"Office Action Issued in Japanese Patent Application No. 2012-110939", dated May 27, 2014, 4 Pages.
"Office Action Issued in Japanese Patent Application No. 2012-153634", dated Sep. 19, 2013, 6 Pages.
"Notice of Allowance Issued in Japanese Patent Application 2012-510906", dated Jul. 10, 2014, 3 Pages. (W/o English Translation).
"Office Action Issued in Japanese Patent Application 2012-510906", dated Jan. 9, 2014, 4 Pages.
Faller, Eric, "RibbonX API: Extend the 2007 Office System with Your Own Ribbon Tabs and Controls", Retrieved from <<http://web.archive.org/web/20070207074144/http://msdn.microsoft.com/msdnmag/issues/07/02/RibbonX/default.aspx>>, Feb. 2007, 12 Pages.
"Office Action Issued in Japanese Patent Application No. 2014-163396", dated Oct. 21, 2015, 5 Pages.
"Office Action Issued in Chinese Patent Application No. 20680018095.3", dated Jul. 14, 2011, 19 Pages.
"Office Action Issued in Israel Patent Application No. 209011", dated Sep. 10, 2013, 5 Pages.
"Office Action Issued in Israel Patent Application No. 209011", dated Dec. 25, 2013, 5 Pages.
"Office Action Issued in Israel Patent Application No. 209012", dated Feb. 28, 2014, 6 Pages.
"Office Action Issued in Israel Patent Application No. 209047", dated May 15, 2014, 6 Pages.
"Office Action Issued in Israel Patent Application No. 209048", dated May 15, 2014, 15 Pages.
"Office Action Issued in Israel Patent Application No. 215418", dated Apr. 28, 2015, 4 Pages.
"Office Action Issued in Israel Patent Application No. 233533", dated May 31, 2016, 4 Pages.
"Notice of Allowance Issued in Canada Patent Application No. 2512047", dated Oct. 2, 2014, 1 Page.
"Notice of Allowance Issued in Canada Patent Application No. 2512102", dated Mar. 31, 2015, 1 Page.
"Office Action Issued in Chile Patent Application No. 200502512", dated Oct. 9, 2013, 7 Pages.
"Office Action Issued in Chile Patent Application 200502512", dated Mar. 4, 2009, 12 Pages.
"Office Report Issued in European Patent Application No. 06790087.8", dated Dec. 2, 2008, 7 Pages.
"Office Action Issued in Canadian Patent Application 2618169", dated Sep. 9, 2014, 4 Pages.
"Office Action and search report Issued in Canadian Patent Application No. 2724681", dated Apr. 15, 2016, 5 Pages.
"Notice of Allowance Issued in Canadian Patent Application No. 2725298", dated Oct. 27, 2015, 1 Page.
"Office Action Issued in Canadian Patent Application No. 2725298", dated Jun. 30, 2014, 1 Page.
Douglas, et al., "Dynamic Popup Menu Titles", An IBM TDB Technical Disclosure, Aug. 1, 1992, 2 pages.
"Office Action Issued in Chile Patent Application 201102804", dated Mar. 4, 2014, 8 Pages.
Dixon, Helen, "What's New in Excel 2007?", In Book of Excel 2007—Beyond the Manual, Feb. 26, 2007, 24 Pages.
Cole,Eric, "New Arrival! Forefront of Downloading", In Mac People, ASCII Corporation, vol. 11, Issue 10, Aug. 31, 2005, 1 Page.
Clifton, Marc, "The Application Automation Layer—Using XML to Dynamically Generale GUI Elements—forms and controls", Retrieved from <<http://www.codeproject.com/Articles/4389/The-Application-Automation-Layer-Using-XML-To-Dyna>>, Jun. 22, 2003, 37 Pages.
"Office Action Issued in Canadian Patent Application No. 2848700", dated May 2, 2016, 04 Pages.
"Office Action Issued in Canadian Patent Application No. 2848700", dated Sep. 29, 2017, 4 Pages.
"Notice of Allowance Issued in Egyptian Patent Application No. 370/2005", dated Jun. 27, 2012, 1 Page. (W/o English Translation).
"Office Action Issued in Egyptian Patent Application 371/2005", dated Apr. 9, 2010, 4 Pages.
"Office Action Issued in New Zealand Patent Application No. 541299", dated Jul. 25, 2005, 2 Pages.
"Office Action Issued in New Zealand Patent Application No. 541299", dated Nov. 8, 2006, 1 Page.
"Office Action Issued in New Zealand Patent Application No. 541300", dated Jul. 25, 2005, 2 Pages.
"Office Action Issued in New Zealand Patent Application No. 541301", dated Jul. 25, 2005, 2 Pages.
"Office Action Issued in New Zealand Patent Application No. 541301", dated Nov. 8, 2006, 1 Page.
"Notice of Allowance Issued in New Zealand Patent Application No. 541301", dated Nov. 30, 2006, 1 Page.
"Office Action Issued in New Zealand Patent Application No. 566363", dated Oct. 14, 2009, 1 Page.
"Office Action Issued in Taiwan Patent Application No. 094122180", dated May 14, 2012, 5 Pages.
"Notice of Allowance Issued in Taiwan Patent Application No. 094123420", dated Nov. 13, 2012, 4 Pages.
"Search Report Issued in Taiwan Patent Application No. 094123420", dated Mar. 12, 2012, 6 Pages.
"Notice of Allowance and Search Report Issued in Taiwan Patent Application No. 094123421", dated Mar. 29, 2012, 6 Pages.
"Notice of Allowance Issued in Taiwan Patent Application No. 094123640", dated Mar. 12, 2013, 4 Pages.
"Office Action Issued in Taiwan Patent Application No. 094123640", dated Feb. 8, 2012, 15 Pages.
"Office Action Issued in Taiwan Patent Application No. 098118252", dated Mar. 17, 2014, 10 Pages.
"Notice of Allowance Issued in Taiwan Patent Application No. 098119245", dated Oct. 15, 2014, 4 Pages.
"Notice of Allowance Issued in Taiwan Patent Application No. 098145363", dated Aug. 13, 2015, 4 Pages.
Adler, Richard M.., "Emerging Standards for Component Software", In IEEE Computer, vol. 28, Issue 3, Mar. 1, 1995, 10 Pages.
"Office Action Issued in Thailand Patent Application No. 0501003163", dated Oct. 8, 2018, 4 Pages.
"Office Action Issued in European Patent Application No. 097273312", dated Aug. 27, 2018, 4 Pages.
"Final Office Action Issued in U.S. Appl. No. 14/981,404", dated Jul. 30, 2018, 11 Pages.
"Notice of Allowance Issued in U.S. Appl. No. 14/981,404", dated Sep. 26, 2018, 10 Pages.

(56) References Cited

OTHER PUBLICATIONS

"Notice of Allowance Issued in Malaysia Application No. PI2011003348", dated May 31, 2018, 2 Pages.
Gorniak, Peter J.., "Sorting Email Messages by Topic", Retrieved From http://www.researchgate.net/publication/243765639_Sorting_email_messages_by_topic, 1998, 1 Page.
"Office Action Issued in Mexican Patent Application No. MX/a/2008/003342", dated May 31, 2013, 9 Pages.
Haden, GL, "Scrollable Popup Menu with Selection Tracking Display of Graphical Objects", An IBM TDB Technical Disclosure, Aug. 1, 1994, 4 Pages.
Halvorson, et al., "Microsoft Office Professional Official Manual", Nikkei BP Soft Press Publishers, Aug. 20, 2002, 10 Pages.
Halvorson, et al., "Microsoft Office XP Inside Out", Microsoft Press, In Book Microsoft Office XP Inside Out, May 9, 2001, pp. 757-760.
Harris, Jensen, "Picture This: A New Look for Office", Retrieved From: <<https://blogs.msdn.microsoft.com/iensenh/2006/03/09/picture-this-a-new-look-for-office/>>, Mar. 9, 2006, pp. 1-91.
"Office Action Issued in Mexican Patent Application No. MX/a/2008/003342", dated Jan. 28, 2014, 8 Pages.
Hock, Randolph, "Yahoo! To the Max", In Book an Extreme Searcher Guide, May 10, 2005, 5 Pages.
"Office Action Issued in Mexican Patent Application No. MX/a/2008/003342", dated May 7, 2012, 8 Pages.
Inoue, "Let's Learn PowerPoint Using Actual Samples", Nikkei Business Publications, Inc, vol. 13, Issue 7, Apr. 1, 2008, 5 Pages.
Islam, et al., "Email Categorization Using Multi Stage Classification Technique", In Eighth International Conference on Parallel and Distributed Computing, Applications and Technologies, Dec. 3, 2007, 8 Pages.
"Office Action Issued in Mexican Patent Application No. MX/a/2008/002889", dated Sep. 20, 2012, 11 Pages.
Khavari, Sam, "Preview Pane in Conversation: 4 pane view", Retrieved from <<https://bugzilla.zimbra.com/show_bug.cgi?id=450>>, Retrieved on Mar. 3, 2008, 3 Pages.
Kumar, et al., "A Personal Agent Application for the Semantic Web", In AAAI Fall Symposium on Personalized Agents, Nov. 15, 2002, 8 Pages.
Lowe, Scott, "An introduction to the Microsoft Office 2007 ribbon interface", In TechRepublic, Dec. 11, 2006, pp. 1-11.
Lyons, et al., "The Oval Menu-Evolution and Evaluation of a Wedget", In Proceedings of the 6th Australian Conference on Computer-Human Interaction, Nov. 24, 1996, 8 Pages.
Maes, et al., "Learning Interface Agents", In AAAI, vol. 93, Jul. 11, 1993, pp. 459-465.
"Office Action Issued in Mexican Patent Application No. MX/a/2008/002889", dated Jun. 24, 2013, 13 Pages.
Milstein, Sarah, "The Missing Manual: The book that should have been in the box", First Edition; O'Reilly Japan, Inc., Nov. 25, 2004, 1 Page.
"Search Report and Written Opinion Issued in Singapore Patent Application No. 200504475-5", dated Sep. 19, 2006, 15 Pages.
"Notice of Allowance Issued in Singapore Patent Application No. 200504508-3", dated Sep. 30, 2008, 1 Page.
"Search Report and Written Opinion Issued in Singapore Patent Application No. 200504508-3", dated Sep. 18, 2006, 15 pages.
"Search Report and Written Opinion Issued in Singapore Patent Application No. 200505257-6", dated Feb. 12, 2007, 6 Pages.
"Decision on Reexamination Issued in Chinese Patent Application No. 200510089514.X", dated Feb. 1, 2012, 23 Pages.
"Office Action Issued in Chinese Patent Application No. 200510089514.X", dated May 23, 2008, 16 Pages.
"Office Action Issued in Chinese Patent Application No. 200510089514.X", dated Jan. 21, 2011, 8 Pages.
"Office Action Issued in Chinese Patent Application No. 200510089514.X", dated Mar. 25, 2011, 9 Pages.
"Office Action Issued in Chinese Patent Application No. 200510089514.X", dated Apr. 3, 2009, 12 Pages.
"Office Action Issued in Chinese Patent Application No. 200510089514.X", dated Nov. 21, 2008, 14 Pages.
"Office Action Issued in Chinese Patent Application No. 200510092139.4", dated Mar. 21, 2008, 21 Pages.
"Notice of Allowance Issued in Chinese Patent Application No. 200510092139A", dated Oct. 16, 2009, 4 Pages.
"Office Action Issued in Chinese Patent Application No. 200510092139.4", dated Oct. 17, 2008, 19 Pages.
"Office Action Issued in Chinese Patent Application No. 200510092139.4", dated Jun. 19, 2009, 7 Pages.
"Office Action Issued in Chinese Patent Application No. 200510092141.1", dated Apr. 11, 2008, 22 Pages.
"Notice of Allowance Issued in Patent Application No. 200510092141.1", dated Mar. 20, 2009, 5 Pages.
"Office Action Issued in Chinese Patent Application No. 200510092141.1", dated Oct. 10, 2008, 22 Pages.
"Notice of Allowance Issued in Chinese Patent Application 200510092142.6", dated Jun. 18, 2010, 4 Pages.
"Notice of Allowance Issued in Chinese Patent Application No. 200510092146.4", dated Nov. 14, 2008, 4 Pages.
"Office Action Issued in Russian Patent Application 2005120363", dated Oct. 21, 2009, 12 Pages.
Barr, Jim, "Gmail Tips—The Complete Collection", Retrieved from https://web.archive.org/web/20041215091758/http://g04.com/misc/GmailTipsComplete.html, Retrieved on Dec. 15, 2004, 18 Pages.
"Office Action Issued in Russian Patent Application No. 2005120363/28", dated Jun. 24, 2009, 8 Pages.
Baker, Donna, "Configuring the Pages Pane in Acrobat", Retrieved from <<http://www.planetpdf.com/enterprise/article.asp?ContentID=6115>>, Apr. 22, 2004, 4 Pages.
"Notice of Allowance Issued in Russian Patent Application No. 2005125831/09", dated Nov. 6, 2009., 17 Pages.
"Office Action Issued in Russian Patent Application No. 2005125831/09", dated Jul. 30, 2009, 17 Pages.
"Notice of Allowance Issued in Russian Patent Application No. 2005125836/09", dated Jun. 22, 2010, 21 Pages.
"Office Action Issued in Russian Patent Application No. 2005125836/09", dated Oct. 9, 2009, 10 Pages.
"Office Action Issued in Russian Patent Application No. 2005125836/09", dated Sep. 10, 2009, 10 Pages.
"Office Action Issued in Russian Patent Application 200512583609", dated Dec. 28, 2009, 2 Pages.
"Notice of Allowance Issued in Russian Patent Application 2005125837/08", dated Jul. 10, 2010, 23 Pages.
"Notice of Allowance Issued in Russian Patent Application No. 2005125839/09", dated Mar. 11, 2010, 25 Pages.
"Office Action Issued in Japanese Patent Application No. 2005-184990", dated Aug. 12, 2011, 6 Pages.
"Office Action Issued in Australian Patent Application No. 2005202717", dated May 28, 2010, 2 Pages.
"Notice of Allowance Issued in Australian Patent Application No. 2005203409", dated May 19, 2010, 3 Pages.
"Office Action Issued in Australian Patent Application No. 2005203409", dated Mar. 26, 2010, 1 Page.
"Notice of Allowance Issued in Australian Patent Application No. 2005203410", dated Aug. 2, 2010, 3 Pages.
"Notice of Allowance Issued in Australian Patent Application 2005203411", dated Jul. 15, 2010, 3 Pages.
"Notice of Allowance Issued in Australian Patent Application No. 2005203412", dated May 19, 2010, 3 Pages.
"Office Action Issued in Australian Patent Application No. 2005203412", dated Mar. 25, 2010, 2 Pages.
"Notice of Allowance Issued in Japanese Patent Application No. 2005-236087", dated Aug. 23, 2011, 6 Pages.
"Notice of Allowance Issued in Japanese patent Application No. 2005-236088", dated Apr. 28, 2011, 6 pages.
"Notice of Allowance Issued in Japanese Patent Application 2005-236089", dated Aug. 23, 2011, 6 Pages.
Mock, Kenrick, "An Experimental Framework for Email Categorization and Management", In Proceedings of the 24th Annual International ACM SIGIR Conference on Research and Development in Information Retrieval, Sep. 1, 2001, 3 Pages.

(56) References Cited

OTHER PUBLICATIONS

"Notice of Allowance Issued in Japanese Patent Application No. 2005-236090", dated May 20, 2011, 6 Pages.
"Notice of Allowance Issued in Norway Patent Application No. 20053655", dated Jul. 4, 2016, 2 Pages.(W/o English Translation).
"Office Action Issued in Norway Patent Application No. 20053655", dated Jul. 16, 2015, 2 Pages.
"Office Action Issued in Norweign Patent Application No. 20053655", dated Nov. 29, 2014, 3 Pages.
"Office Action Issued in Norweign Patent Application No. 20053655", dated Dec. 16, 2014, 3 Pages.
"Office Action and Search Report Issued in Norweign Patent Application No. 20053655", dated Feb. 10, 2014, 4 Pages.
Atwood, Jeff, "Sometime a Word is Worth a Thousand Icons", Retrieved from <<https://web.archive.org/web/20090314174654/http://www.codinghorror.com/blog/archives/000523.html>>, Feb. 22, 2006, 9 Pages.
"Non-Final Office Action Issued in U.S. Appl. No. 10/982,073", dated Jan. 25, 2010, 10 Pages.
"Office Action Issued in Indian Patent Application No. 1017/DEL/2004", dated Oct. 21, 2013, 2 Pages.
"Office Action Issued in Korean Patent Application No. 10-2004-0048176", dated Jan. 30, 2012, 5 Pages.
"Office Action Issued in Korean Patent Application No. 10-2004-0048176", dated May 17, 2011, 9 Pages.
"Office Action Issued in Korean Patent Application No. 10-2005-0058160", dated Jul. 22, 2011, 5 Pages.
"Notice of Allowance Issued in Korean Patent Application No. 10-2005-0066460", dated Jan. 31, 2012,(W/o English Translation).
"Office Action Issued in Korean Patent Application No. 10-2005-0066460", dated Aug. 29, 2011, 7 Pages.
"Notice of Allowance Issued in Korean Patent Application No. 10-2005-0067236", dated Mar. 12, 2012, 2 Pages.
"Office Action Issued in Korean Patent Application No. 10-2005-0067236", dated Aug. 23, 2011, 5 Pages.
"Notice of Allowance Issued in Korean Patent Application No. 10-2005-0067257", dated May 18, 2012, 2 Pages.
"Office Action Issued in Korean Patent Application No. 10-2005-0067257", dated Nov. 3, 2011, 4 Pages.
"Notice of Allowance Issued in Korean Patent Application 10-2005-0067411", dated Mar. 12, 2012, 2 Pages. W/o English Translation).
"Office Action Issued in Korean Patent Application No. 10-2005-0067411", dated Aug. 23, 2011, 6 Pages.
"Office Action Issued in Korean Patent Application No. 10-2007-7024571", dated Jul. 19, 2012, 6 Pages.
"Office Action Issued in Korean Patent Application No. 10-2008-7005078", dated Feb. 22, 2013, 13 Pages.
"Office Action Issued in Korean Patent Application 10-2008-7005366", dated Feb. 25, 2013, 5 Pages.
"Office Action Issued in Korean Application No. 10-2008-7005659", dated Mar. 19, 2013, 4 Pages.
"Final Office Action Issued in U.S. Appl. No. 11/332,822", dated Apr. 23, 2015, 29 Pages.
"Notice of Allowance Issued in Korean Patent Application No. 10-2008-7005939", dated Nov. 20, 2013, 2 Pages.
"Office Action Issued in Korean Patent Application 10-2008-7005939", dated Nov. 12, 2012, 7 Pages.
"Office Action Issued in Korean Patent Application No. 10-2008-7005939", dated May 20, 2013, 3 Pages.
"Office Action Issued in Korean Patent Application 10-2008-7029272", dated Nov. 7, 2013, 7 Pages.
"Office Action Issued in Korean Patent Application No. 10-2010-7028097", dated Apr. 28, 2016, 6 Pages.
"Office Action Issued in Korean Patent Application 10-2010-7028097", dated Sep. 30, 2015, 7 Pages. (W/O English Translation).
"Office Action Issued in Korean Patent Application No. 10-2010-7028989", dated Oct. 19, 2015, 7 Pages. (W/O English Translation).
"Notice of Allowance Issued in Korean Patent Application No. 10-2010-7029199", dated Apr. 24, 2015, 2 Pages. (W/O English Translation).
"Notice of Allowance Issued in Korean Patent Application No. 10-2011-7018813", dated Sep. 28, 2016, 2 Pages. (W/O English Translation).
"Notice of Allowance Issued in Korean Patent Application No. 10-2011-7026740", dated Sep. 8, 2016, 2 Pages. (W/O English Translation).
"Office Action Issued in Korean Patent Application No. 10-2011-7026740", dated Mar. 11, 2016, 4 Pages.
"Office Action Issued in Korean Patent Application No. 10-2012-0024393", dated Jul. 2, 2012, 5 Pages.
"Notice of Allowance Issued in Korean Patent Application No. 10-2016-7034274", dated Jan. 31, 2017, 2 Pages.(W/O English Translation).
"Notice of Allowance Issued in Taiwan Patent Application No. 102112935", dated Aug. 31, 2015, 4 Pages.
"Search Report Issued in European Patent Application No. 10775348.5", dated Jun. 2, 2014, 6 Pages.
"Office Action Issued in European Patent Application No. 10775348.5", dated May 18, 2015, 7 Pages.
"Final Office Action Issued in U.S. Appl. No. 11/136,800", dated Jul. 9, 2008, 21 Pages.
"Non-Final Office Action Issued in U.S. Appl. No. 11/136,800", dated Sep. 6, 2007, 15 Pages.
"Final Office Action Issued in U.S. Appl. No. 11/151,686", dated Jul. 24, 2008, 17 Pages.
"Final Office Action Issued in U.S. Appl. No. 11/151,686", dated Oct. 28, 2008, 17 Pages.
"Final Office Action Issued in U.S. Appl. No. 11/151,686", dated Dec. 8, 2009, 21 Pages.
"Non-Final Office Action Issued in U.S. Appl. No. 11/151,686", dated Jun. 11, 2009, 18 Pages.
"Non-Final Office Action Issued in U.S. Appl. No. 11/151,686", dated Sep. 26, 2007, 15 Pages.
"Final Office Action Issued in U.S. Appl. No. 11/154,278", dated Jun. 10, 2009, 29 Pages.
"Non-Final Office Action Issued in U.S. Appl. No. 11/154,278", dated Nov. 25, 2008, 23 Pages.
"Non-Final Office Action Issued in U.S. Appl. No. 11/154,278", dated Nov. 13, 2009, 32 Pages.
"Final Office Action Issued in U.S. Appl. No. 11/217,071", dated Mar. 30, 2010, 18 Pages.
"Non-Final Office Action Issued in U.S. Appl. No. 11/217,071", dated Sep. 15, 2009, 17 Pages.
"Non-Final Office Action Issued in U.S. Appl. No. 11/217,071", dated Sep. 21, 2010, 17 Pages.
"Amendment and Response Filed in U.S. Appl. No. 11/332,822", filed Aug. 11, 2016, 7 Pages.
"Final Office Action Issued in U.S. Appl. No. 11/332,822", dated Mar. 3, 2014, 27 Pages.
"Final Office Action Issued in U.S. Appl. No. 11/332,822", dated Jun. 25, 2010, 25 Pages.
"Final Office Action Issued in U.S. Appl. No. 11/332,822", dated Jun. 7, 2011, 17 Pages.
"Non-Final Office Action Issued in U.S. Appl. No. 11/332,822", dated Aug. 14, 2013, 17 Pages.
"Non-Final Office Action Issued in U.S. Appl. No. 11/332,822", dated Oct. 10, 2014, 28 Pages.
"Non-Final Office Action Issued in U.S. Appl. No. 11/332,822", dated Oct. 5, 2009, 15 Pages.
"Non-Final Office Action Issued in U.S. Appl. No. 11/332,822", dated Feb. 1, 2011, 17 Pages.
"Notice of Allowance Issued in U.S. Appl. No. 11/332,822", dated Jul. 6, 2016, 9 Pages.
"Notice of Allowance Issued in U.S. Appl. No. 11/332,822", dated Aug. 26, 2016, 9 Pages.
"Notice of Allowance Issued in U.S. Appl. No. 11/332,822", dated Dec. 12, 2016, 2 Pages.
"Notice of Allowance Issued in U.S. Appl. No. 11/332,822", dated Nov. 8, 2016, 3 Pages.
"Notice of Allowance Issued in U.S. Appl. No. 11/332,822", dated Sep. 14, 2016, 2 Pages.
"Final Office Action Issued in U.S. Appl. No. 11/401,470", dated Jul. 8, 2011, 13 Pages.

(56) References Cited

OTHER PUBLICATIONS

"Final Office Action Issued in U.S. Appl. No. 11/401,470", dated Aug. 6, 2010, 14 Pages.
"Final Office Action Issued in U.S. Appl. No. 11/401,470", dated Sep. 23, 2009, 14 Pages.
"Non- Final Office Action Issued in U.S. Appl. No. 11/401,470", dated Mar. 18, 2009, 14 Pages.
"Non-Final Office Action Issued in U.S. Appl. No. 11/401,470", dated Feb. 22, 2010, 15 Pages.
"Non-Final Office Action Issued in U.S. Appl. No. 11/401,470", dated Feb. 11, 2011, 12 Pages.
"Non- Final Office Action Issued in U.S. Appl. No. 11/401,470", dated May 23, 2013, 17 Pages.
"Non-Final Office Action Issued in U.S. Appl. No. 11/430,416", dated Jun. 27, 2008, 24 Pages.
"Final Office Action Issued in U.S. Appl. No. 11/430,561", dated Aug. 17, 2009, 17 Pages.
"Non-Final Office Action Issued in U.S. Appl. No. 11/430,561", dated Jan. 9, 2009, 16 Pages.
"Final Office Action Issued in U.S. Appl. No. 11/430,562", dated Nov. 13, 2008, 32 Pages.
"Final Office Action Issued in U.S. Appl. No. 11/430,562", dated Jan. 7, 2010, 37 Pages.
"Final Office Action Issued in U.S. Appl. No. 11/430,562", dated May 19, 2011, 45 Pages.
"Non Final Office Action Issued in U.S. Appl. No. 11/430,562", dated Mar. 1, 2013, 46 Pages.
"Non-Final Office Action Issued in U.S. Appl. No. 11/430,562", dated Jun. 22, 2010, 36 Pages.
"Non-Final Office Action Issued in U.S. Appl. No. 11/430,562", dated Dec. 16, 2010, 36 Pages.
"Non-Final Office Action Issued in U.S. Appl. No. 11/430,562", dated Jun. 19, 2009, 38 Pages.
"Non-Final Office Action Issued in U.S. Appl. No. 11/430,562", dated May 30, 2008, 25 Pages.
"Notice of Allowance Issued in U.S. Appl. No. 11/430,562", dated Sep. 5, 2013, 25 Pages.
"Final Office Action Issued in U.S. Appl. No. 11/445,393", dated Oct. 8, 2008, 15 pages.
"Final Office Action Issued in U.S. Appl. No. 11/445,393", dated Nov. 24, 2009, 8 Pages.
"Final Office Action Issued in U.S. Appl. No. 11/445,393", dated Apr. 21, 2011, 11 Pages.
"Non-Final Office Action Issued in U.S. Appl. No. 11/445,393", dated Dec. 20, 2010, 9 Pages.
"Non-Final Office Action Issued in U.S. Appl. No. 11/445,393", dated Jun. 1, 2009, 5 Pages.
"Non-Final Office Action Issued in U.S. Appl. No. 11/445,393", dated Feb. 22, 2008, 16 Pages.
"Notice of Allowance Issued in U.S. Appl. No. 11/445,393", dated Apr. 16, 2013, 6 Pages.
"Notice of Allowance Issued in U.S. Appl. No. 11/445,393", dated Nov. 10, 2011, 5 Pages.
"Final Office Action Issued in U.S. Appl. No. 11/782,059", dated Apr. 18, 2014, 27 Pages.
"Final Office Action Issued in U.S. Appl. No. 11/782,059", dated Apr. 26, 2012, 27 Pages.
"Final Office Action Issued in U.S. Appl. No. 11/782,059", dated Feb. 18, 2010, 18 Pages.
"Non-Final Office Action Issued in U.S. Appl. No. 11/782,059", dated Aug. 18, 2009, 17 Pages.
"Non-Final Office Action Issued in U.S. Appl. No. 11/782,059", dated Jan. 12, 2012, 28 Pages.
"Non-Final Office Action Issued in U.S. Appl. No. 11/782,059", dated Sep. 18, 2014, 28 Pages.
"Non-Final office Action Issued in U.S. Appl. No. 11/782,059", dated Nov. 22, 2010, 26 Pages.
"Non-Final Office Action Issued in U.S. Appl. No. 11/782,059", dated Jul. 1, 2010, 23 Pages.
"Non-Final Office Action Issued in U.S. Appl. No. 11/782,059", dated Apr. 4, 2013, 22 Pages.
"Non-Final Office Action Issued in U.S. Appl. No. 11/782,059", dated Nov. 23, 2012, 27 Pages.
"Final Office Action Issued in U.S. Appl. No. 11/782,059", dated Jul. 23, 2013, 26 Pages.
"Final Office Action Issued in U.S. Appl. No. 11/782,059", dated Jun. 30, 2015, 30 Pages.
"Final Office Action Issued in U.S. Appl. No. 11/782,059", dated Feb. 24, 2015, 22 Pages.
"Non-Final Office Action received for U.S. Appl. No. 11/782,059", dated Nov. 15, 2013, 25 Pages.
"Office Action Issued in U.S. Appl. No. 11/823,999", dated Jan. 5, 2011, 12 Pages.
"Non-Final Office Action Issued in U.S. Appl. No. 11/823,999", dated Apr. 15, 2010, 9 Pages.
"Final Office Action Issued in U.S. Appl. No. 12/028,797", dated Apr. 25, 2014, 16 Pages.
"Final Office Action Issued in U.S. Appl. No. 12/028,797", dated Dec. 29, 2010, 16 Pages.
"Final Office Action Issued in U.S. Appl. No. 12/028,797", dated Dec. 9, 2009, 13 Pages.
"Non-Final Office Action Issued in U.S. Appl. No. 12/028,797", dated Apr. 28, 2009, 12 Pages.
"Non-Final Office Action Issued in U.S. Appl. No. 12/028,797", dated Jun. 3, 2010, 16 Pages.
"Non-Final Office Action Issued in U.S. Appl. No. 12/028,797", dated Jan. 15, 2015, 16 Pages.
"Notice of Allowance Issued in U.S. Appl. No. 12/028,797", dated Feb. 27, 2015, 14 Pages.
"Non-Final Office Action Issued in U.S. Appl. No. 12/028,797", dated Sep. 6, 2013, 14 Pages.
"Final Office Action Issued in U.S. Appl. No. 12/142,927", dated Aug. 3, 2011, 15 Pages.
"Non Final Office Action Issued in U.S. Appl. No. 12/142,927", dated Mar. 14, 2012, 15 Pages.
"Non-Final Office Action Issued in U.S. Appl. No. 12/142,927", dated Jan. 6, 2011, 10 Pages.
"Notice of Allowance Issued in U.S. Appl. No. 12/142,927", dated Mar. 3, 2017, 2 Pages.
"Notice of Allowance Issued in U.S. Appl. No. 12/142,927", dated Jan. 9, 2017, 10 Pages.
"Notice of Allowance Issued in U.S. Appl. No. 12/142,927", dated Jan. 30, 2017, 7 Pages.
"Notice of Allowance Issued in U.S. Appl. No. 12/142,927", dated May 3, 2017, 2 Pages.
"Non-Final Office Action Issued in U.S. Appl. No. 12/142,927", dated Jul. 24, 2013, 22 Pages.
"Final Office Action Issued in U.S. Appl. No. 12/142,927", dated Dec. 31, 2012, 49 Pages.
"Non-Final Office Action Issued in U.S. Appl. No. 12/142,927", dated Mar. 27, 2015, 23 Pages.
"Final Office Action Issued in U.S. Appl. No. 12/142,927", dated Sep. 14, 2015, 31 Pages.
"Non-Final Office Action Issued in U.S. Appl. No. 12/142,927", dated Apr. 7, 2016, 21 Pages.
"Final Office Action Issued in U.S. Appl. No. 12/142,927", dated Mar. 4, 2014, 20 Pages.
"Final Office Action Issued in U.S. Appl. No. 12/144,642", dated Sep. 16, 2010, 12 Pages.
"Final Office Action Issued in U.S. Appl. No. 12/144,642", dated Oct. 25, 2011, 14 Pages.
"Non-Final Office Action Issued in U.S. Appl. No. 12/144,642", dated May 8, 2012, 14 Pages.
"Non-Final Office Action Issued in U.S. Appl. No. 12/144,642", dated Apr. 23, 2010, 11 Pages.
"Non-Final Office Action Issued in U.S. Appl. No. 12/144,642", dated Feb. 1, 2011, 12 Pages.
"Final Office Action Issued in U.S. Appl. No. 12/163,758", dated Apr. 5, 2012, 10 Pages.
"Non final Office Action Issued in U.S. Appl. No. 12/163,758", dated Sep. 14, 2011, 10 Pages.

(56) References Cited

OTHER PUBLICATIONS

"Notice of Allowance Issued in U.S. Appl. No. 12/163,758", dated Apr. 4, 2013, 7 Pages.
"Final Office Action Issued in U.S. Appl. No. 12/163,784", dated Jul. 8, 2011, 20 Pages.
"Non-Final Office Action Issued in U.S. Appl. No. 12/163,784", dated Mar. 14, 2011, 20 Pages.
"Non-Final Office Action Issued in U.S. Appl. No. 12/163,784", dated Sep. 11, 2012, 22 Pages.
"Final Office Action Issued in U.S. Appl. No. 12/163,784", dated Apr. 1, 2013, 24 Pages.
"Office Action Issued in Phillipines Patent Application PH12005405", dated Jan. 19, 2006, 1 Page.
"Notice of Allowance Issued in U.S. Appl. No. 12/372,386", dated Nov. 24, 2014, 11 Pages.
"Notice of Allowance Issued in U.S. Appl. No. 12/372,386", dated Mar. 10, 2015, 3 Pages.
"Notice of Allowance Issued in U.S. Appl. No. 12/372,386", dated Mar. 23, 2015, 5 Pages.
"Final Office Action Issued in U.S. Appl. No. 12/414,317", dated Aug. 6, 2013, 26 Pages.
"Final Office Action Issued in U.S. Appl. No. 12/414,317", dated Aug. 29, 2012, 23 Pages.
"Non-Final Office Action Issued in U.S. Appl. No. 12/414,317", dated Jan. 25, 2013, 22 Pages.
"Non-Final Office Action Issued in U.S. Appl. No. 12/414,317", dated Jan. 17, 2012, 23 Pages.
"Non-Final Office Action Issued in U.S. Appl. No. 12/414,317", dated Mar. 22, 2011, 20 Pages.
"Final Office Action Issued in U.S. Appl. No. 12/464,584", dated Jan. 26, 2012, 19 Pages.
"Non-Final Office Action Issued in U.S. Appl. No. 12/464,584", dated Jun. 9, 2011, 19 Pages.
"Final Office Action Issued in U.S. Appl. No. 12/574,256", dated Aug. 30, 2013, 7 Pages.
"Final Office Action Issued in U.S. Appl. No. 12/574,256", dated Apr. 21, 2011, 11 Pages.
"Non Final Office Action Issued in U.S. Appl. No. 12/574,256", dated Mar. 14, 2013, 12 Pages.
"Non-Final Office Action Issued in U.S. Appl. No. 12/574,256", dated Dec. 20, 2010, 10 Pages.
"Notice of Allowance Issued in U.S. Appl. No. 12/574,256", dated Sep. 19, 2013, 14 Pages.
"Notice of Allowance Issued in U.S. Appl. No. 12/725,605", dated Apr. 2, 2012, 18 Pages.
"Notice of Allowance Issued in U.S. Appl. No. 12/725,605", dated Mar. 4, 2013, 6 Pages.
"Notice of Allowance Issued in U.S. Appl. No. 12/725,605", dated Apr. 25, 2013, 12 Pages.
"Specification Issued in U.S. Appl. No. 12/725,605", dated Feb. 26, 2013, 2 Pages.
"Final Office Action Issued in U.S. Appl. No. 12/753,923", dated May 12, 2011, 12 Pages.
"Non-Final Office Action Issued in U.S. Appl. No. 12/753,923", dated Nov. 26, 2010, 15 Pages.
"Non-Final Office Action Issued in U.S. Appl. No. 12/769,787", dated Jun. 19, 2012, 16 Pages.
"Non-Final Office Action Issued in U.S. Appl. No. 12/777,287", dated Jun. 6, 2012, 18 Pages.
"Non-Final Office Action Issued in U.S. Appl. No. 12/777,287", dated Aug. 2, 2013, 19 Pages.
"Final Office Action Issued in U.S. Appl. No. 12/777,287", dated Dec. 5, 2012, 17 Pages.
"Final Office Action Issued in U.S. Appl. No. 12/777,287", dated Jan. 29, 2014, 23 Pages.
"Non-Final Office Action Issued in U.S. Appl. No. 12/814,084", dated Jan. 19, 2012, 14 Pages.
"Final Office Action Issued in U.S. Appl. No. 12/954,952", dated Sep. 10, 2014, 13 Pages.
"Final Office Action Issued in U.S. Appl. No. 12/954,952", dated Apr. 29, 2013, 12 pages.
"Non-Final Office Action Issued in U.S. Appl. No. 12/954,952", dated Dec. 12, 2012, 13 Pages.
"Non-Final Office Action Issued in U.S. Appl. No. 12/954,952", dated Feb. 26, 2014, 11 Pages.
"Office Action Issued in Malaysian Patent Application No. PI 20053259", dated Jan. 31, 2012, 3 Pages.
"Office Action Issued in Phillipines Patent Application 1-2005-000406", dated Apr. 21, 2008, 1 Page.
"Office Action Issued in Phillipines Patent Application 12005000495", dated Jul. 31, 2008, 1 Page.
"Office Action Issued in Phillipines Patent Application Jan. 2005-000495", dated Apr. 25, 2013, 2 Pages.
"Office Action Issued in Phillipines Patent Application 1200500406", dated Sep. 12, 2008, 1 Page.
"Office Action Issued in Phillipines Patent Application No. 1-2008-500356", dated Apr. 30, 2014, 1 Page.
"Non-Final Office Action Issued in U.S. Appl. No. 13/027,289", dated May 30, 2014, 13 Pages.
"Non-Final Office Action issued in U.S. Appl. No. 13/102,622", dated Jun. 3, 2013, 5 Pages.
"Non Final Office Action Issued in U.S. Appl. No. 13/102,633", dated Apr. 19, 2012, 19 Pages.
"Final Office Action Issued in U.S. Appl. No. 13/102,633", dated Jan. 16, 2014, 16 Pages.
"Final Office Action Issued in U.S. Appl. No. 13/102,633", dated Oct. 24, 2012, 17 Pages.
"Non-Final Office Action Issued in U.S. Appl. No. 13/102,633", dated Jun. 3, 2013, 29 Pages.
"Non-Final Office Action Issued in U.S. Appl. No. 13/102,633", dated Jul. 30, 2014, 16 Pages.
"Final Office Action Issued in U.S. Appl. No. 13/102,633", dated Dec. 24, 2014, 17 Pages.
"Notice of Allowance Issued in U.S. Appl. No. 13/169,598", dated Apr. 7, 2016, 4 Pages.
"Amendment and Response Filed in U.S. Appl. No. 13/427,939", filed Aug. 3, 2016, 14 Pages.
"Final Office Action Issued in U.S. Appl. No. 13/427,939", dated May 25, 2016, 18 Pages.
"Final Office Action Issued in U.S. Appl. No. 13/427,939", dated Apr. 29, 2015, 14 Pages.
"Non-Final Office Action Issued in U.S. Appl. No. 13/427,939", dated Oct. 1, 2015, 18 Pages.
"Non-Final Office Action Issued in U.S. Appl. No. 13/427,939", dated Sep. 11, 2014, 16 Pages.
"Notice of Allowance Issued in U.S. Appl. No. 13/427,939", dated Apr. 7, 2017, 2 Pages.
"Notice of Allowance Issued in U.S. Appl. No. 13/427,939", dated Feb. 22, 2017, 3 Pages.
"Notice of Allowance Issued in Malaysian Patent Application No. PI 20053258", dated Oct. 15, 2012, 2 Pages.
"Notice of Allowance Issued in U.S. Appl. No. 13/427,939", dated Jan. 17, 2017, 9 Pages.
"Notice of Allowance Issued in U.S. Appl. No. 13/427,939", dated Sep. 13, 2016, 13 Pages.
"Non-Final Office Action Issued in U.S. Appl. No. 13/437,031", dated Jun. 15, 2017, 9 Pages.
"Non-Final Office Action Issued in U.S. Appl. No. 13/437,031", dated Nov. 28, 2014, 13 Pages.
"Non-Final Office Action Issued in U.S. Appl. No. 13/437,031", dated Sep. 13, 2012, 14 Pages.
"Final Office Action Issued in U.S. Appl. No. 13/437,031", dated Dec. 27, 2016, 8 Pages.
"Final Office Action Issued in U.S. Appl. No. 13/437,031", dated May 21, 2013, 13 Pages.
"Non-Final Office Action Issued in U.S. Appl. No. 13/437,031", dated Mar. 21, 2016, 6 Pages.
"2007 Microsoft Office System is Golden", Microsoft News Center, Nov. 6, 2006, 23 Pages.
"Changing a Graph Type: Ultimate Illustration of Excel 2002 for Windows XP", In General Book, X-media Corp, Aug. 31, 2002, 3 Pages.

(56) References Cited

OTHER PUBLICATIONS

"Office Action Issued in Malaysian Patent Application PI 20084401", dated Jan. 15, 2013, 3 Pages.
"Embedding and Linking Excel Worksheets into Word", Retrieved from <<https://web.archive.org/web/20041230032059/http://www.glencoe.com/ps/computered/pas/article.php4?articleId=360>>, Retrieved on Dec. 16, 2014, 6 Pages.
"Homeworking Forum: Disabled Person Work at Home", Retrieved from <<http://web.archive.org/web/20041206125616/http://www.homeworking.com/discus/messages/16/139.html?1069082127>>, Archived on Dec. 6, 2004, 11 pages.
"Look and Layout", Retrieved From <<https://web/archive.org/web/20090821192615/http://www.liv.ac.uk/csd/email/outlook/layout.htm>>, Retrieved on Mar. 3, 2008, 9 Pages.
"Menu Selection Method for Related Attributes", An IBM Technical Disclosure Bulletin, vol. 33, No. 6B, Nov. 1, 1990, pp. 423-425.
"Microsoft Office 2003 Editions Product Guide", Retrieved from <<http://www.jmu.edu/computing/news/archive/issues/2003guide.pdf>>, Sep. 2003, 167 Pages.
"Office Action Issued for Malaysia Patent Application No. PI 2010005439", dated Jan. 30, 2015, 3 Pages.
"Microsoft Office 2007 Word Help", Microsoft Word, Dec. 31, 2007, 3 Pages.
"Office Action Issued in Malaysian Patent Application No. PI 2010005439", dated Jun. 30, 2015, 2 Pages.
"Office Action Issued in Malaysian Patent Application No. PI 2010005558", dated Jan. 30, 2015, 3 Pages.
"Office Action Issued in Malaysian Patent Application No. PI 2010005637", dated Nov. 14, 2014, 3 Pages.
"Office Action Issued in Brazilian Patent Application No. PI0505014-6", dated Jan. 5, 2017, 7 Pages.
"Microsoft Office Professional Plus 2007", Microsoft Corporation, Sep. 2006, 66 Pages.
"Microsoft Office XP", Retrieved from <<http://en.wikipedia.org/wiki/Microsoft_Office_XP>>, May 31, 2001, 3 Pages.
"Microsoft® Office Outlook® 2007 for Dummies®", Published by John Wiley & Sons, Dec. 26, 2006, 9 Pages.
"MSN Desktop Search (beta)", Retrieved From <<http://www.pcmag.com/article2/0,1759,1771841,00.asp<<, Mar. 32, 2005, 2 Pages.
"NEO Pro—the total "find that email" solution!", Retrieved From <<http://www.caelo.com/products/learn/>>, Retrieved on Sep. 15, 2009, 1 Page.
"Office 11 and Office Family Pre Release Program Installation Instructions", In Letter by Microsoft on Beta, Oct. 2002, 6 Pages.
"Office Action Issued in Malaysian Patent Application No. PI20052959", dated Sep. 30, 2010, 4 Pages.
"Notice of Allowance Issued in Malaysian Patent Application No. PI20053259", dated Oct. 15, 2012, 2 Pages.
"Run for the border: using borders in Word", Retrieved on: Feb. 7, 2014, Retrieved From <<https://web.archive.org/web/20040324224844/http://word.mvps.org/FAQs/TblsFldsFms/Borders.htm>>, 5 Pages.
"Screen dumps—Microsoft Office", Microsoft Corporation, Microsoft Office Professional Edition 2003, 2003, 16 Pages.
"Screen Shot of MS_Office_2003", In Microsoft Office Professional Edition 2003, 2003, 6 Pages.
"Notice of Allowance Issued in Malasiyan Patent Application No. PI20084401", dated Aug. 30, 2013, 2 Pages.
"Office Action Issued in Malaysian Patent Application PI2011004990", dated Mar. 15, 2016, 3 Pages.
"The Discussion Board Component of Blackboard: An Instructor's Guide", Retrieved from <<http://domin.dom.edu/documents/blackboard/discussionboard.pdf>>, Aug. 2004, 23 Pages.
"Word 2003 Introduction", Published by The Mouse Training Company, Sep. 9, 2009, 166 Pages.
"The New "Office 2007" User Interface", Microsoft Corporation, 2005, 32 Pages.
"The New Look in Office 12 / Office 2007", Retrieved from <<https://office-watch.com/2005/the-new-look-in-office-12-office-2007/>>, Sep. 20, 2005, 9 Pages.
Piperoglou, Stephanos, "External Style Sheets", Retrieved from <<https://web.archive.org/web/20150923022741/http://www.webreference.com/html/tutorial5/10.html>>, Aug. 20, 1998, 3 Pages.
"To-do List—effective task management software", Retrieved From <<https://web.archive.org/web/20070122185835/http://www.programurl.com:80/to-do-list.htm>>, Retrieved on: Jan. 2, 2007, 6 Pages.
"User Interface Architecture", Retrieved from <<http://www.datamaster2003.com/uiarchitecture.htm>>, Retrieved on: Jan. 28, 2009, 2 Pages.
"VisNetic Mail Flow", Retrieved From https://web.archive.org/web/20050924035746/http://www.deerfield.com/products/visnetic-mailflow/, Retrieved on: Sep. 15, 2009, 1 Page.
"Office Action Issued in Malaysian Patent Application No. PI20080400", dated Aug. 30, 2012, 3 Pages.
"Office Action Issued in Indian Patent Application No. 01489/DELNP/2008", dated Aug. 31, 2015, 3 Pages.
"Search Report Issued in European Patent Application 04102463.9", dated Oct. 20, 2005, 4 Pages.
"Summons to Attend Oral Proceedings Issued in European Patent Application No. 04102463.9", dated Jun. 23, 2008, 12 Pages.
"Office Action Issued in Thailand Patent Application No. 0501003164", dated Aug. 22, 2017, 2 Pages.
"Decision to Refuse and Minutes in Oral Proceeding Issued in European Patent Application No. 05105584.6", dated Mar. 28, 2017, 20 Pages.
"Summons to Attend Oral Proceedings Issued in European Patent Application No. 05105584.6", dated Jul. 22, 2016, 6 Pages.
"Office Action Issued in Malaysian Patent Application No. PI20080508", dated Jan. 15, 2014, 3 Pages.
Ramamritham, et al., "Scheduling Algorithms and Operating Systems Support for Real-Time Systems", In Proceedings of the IEEE, vol. 82, Issue 1, Jan. 1994, 13 Pages.
"Search Report Issued in European Patent Application No. 05107157.9", dated Mar. 1, 2012, 7 Pages.
"Office Action Issued in European Patent Application No. 05107157.9", dated Jul. 20, 2016, 6 Pages.
"Summons to Attend Oral Proceedings issued in European Patent Application No. 05107157.9", dated Sep. 15, 2017, 7 Pages.
"Search Report Issued in European Patent Application No. 05107184.3", dated Mar. 7, 2012, 7 Pages.
"Office Action Issued in Indian Patent Application No. 05584/CHENP/2010", dated Mar. 23, 2018, 7 Pages.
Redmond, Tony, "Microsoft Exchange Server 2003", Excerpt from Book, 2003, 14 Pages.
"Search Report Issued in European Patent Application 06790087.8", dated Nov. 25, 2008, 2 Pages.
"Office Action Issued in European Patent Application No. 06790087.8", dated Mar. 23, 2016, 6 Pages.
"Office Action Issued in European Patent Application No. 06790087.8", dated Mar. 9, 2009, 5 Pages.
"International Search Report and Written Opinion Issued in PCT Application No. PCT/US2009/046344", dated Dec. 29, 2009, 11 Pages.
"Search Report Issued in European Patent Application No. 06803424.8", dated Dec. 6, 2011, 8 Pages.
"Office Action Issued in European Patent Application No. 06803424.8", dated Aug. 17, 2017, 12 Pages.
"International Search Report and Written Opinion Issued in PCT Application No. PCT/US2009/046341", dated Nov. 30, 2009, 11 Pages.
"Office Action Issued in European Patent Application No. 06814334.6", dated Jan. 31, 2017, 5 Pages.
"Search Report Issued in European Patent Application No. 06814334.6", dated Sep. 26, 2012, 10 Pages.
"Office Action Issued in European Patent Application No. 06814358.5", dated Jun. 15, 2010, 1 Page.
"Office Action Issued in European Patent Application No. 07795391.7", dated Jul. 17, 2013, 9 Pages.
"Office Action Issued in European Patent Application No. 077953911", dated Sep. 14, 2009, 5 Pages.
"Office Action Issued in European Patent Application No. 07795391.7", dated Jun. 2, 2014, 9 Pages.

(56) References Cited

OTHER PUBLICATIONS

"Search Report Issued in European Patent Application No. 07795391.7", dated Jun. 9, 2009, 7 Pages.
"Office Action Issued in Indian Patent Application No. 08037/CHENP/2010", dated Mar. 29, 2017, 7 Pages.
"Non-Final Office Action Issued in U.S. Appl. No. 09/896,384", dated Dec. 23, 2003, 7 Pages.
"Notice of Allowance Issued in U.S. Appl. No. 09/896,384", dated Aug. 24, 2004, 9 Pages.
"International Search Report & Written Opinion Issued in PCT Application No. PCT/US2009/044292", dated Dec. 24, 2009, 14 Pages.
"Summons to Attend Oral Proceedings Issued in European Patent Application No. 09006972.5", dated Oct. 4, 2013, 13 Pages.
"Office Action Issued in European Patent Application 090069725", dated Feb. 20, 2014, 15 Pages.
"Office Action Issued in European Patent Application No. 090069725", dated Sep. 28, 2009, 6 Pages.
"Search Report Issued in European Patent Application No. 09006972.5", dated Sep. 15, 2009, 5 Pages.
"International Search Report and Written Opinion Issued in PCT Application No. PCT/US2007/012573", dated Nov. 27, 2007, 9 pages.
"Office Action Issued in European Patent Application No. 09727331.2", dated Mar. 19, 2018, 4 Pages.
"Office Action Issued in European Patent Application No. 09767220.8", dated Sep. 18, 2017, 4 Pages.
"Search Report Issued in European Patent Application No. 09767220.8", dated Jan. 30, 2013, 8 Pages.
"Office Action Issued in European Patent Application No. 097672208", dated Jan. 27, 2014, 7 Pages.
"Search Report Issued in European Patent Application No. 09770705.3", dated Dec. 14, 2017, 8 Pages.
"Search Report Issued in European Patent Application No. 09770706.1", dated Nov. 14, 2017, 8 Pages.
"Office Action Issued in European Patent Application No. 09798374.6", dated Feb. 11, 2014, 6 Pages.
"Summons to Attend Oral Proceedings Issued in European Patent Application No. 09798374.6", dated Jun. 1, 2017, 11 Pages.
"Supplementary Search Report Issued in European Patent Office Patent Application No. 09798374.6", dated May 10, 2013, 6 Pages.
"Search Report Issued in Taiwan Patent Application 098117357", dated May 7, 2014, 13 Pages.
"Search Report Issued in Taiwan Patent Application No. 098119245", dated May 20, 2014, 11 Pages.
"Final Office Action Issued in U.S. Appl. No. 10/607,020", dated Nov. 9, 2010, 17 Pages.
"Final Office Action Issued in U.S. Appl. No. 10/607,020", dated Jan. 6, 2010, 18 Pages.
"Non-Final Office Action Issued in U.S. Appl. No. 10/607,020", dated Jan. 4, 2007, 15 Pages.
"Non-Final Office Action Issued in U.S. Appl. No. 10/607,020", dated May 25, 2010, 17 Pages.
"Notice of Allowance Issued in U.S. Appl. No. 10/607,020", dated Jul. 5, 2007, 6 Pages.
"Notice of Allowance Issued in U.S. Appl. No. 10/607,020", dated Feb. 28, 2017, 20 Pages.
"Final Office Action Issued in U.S. Appl. No. 10/607,020", dated Feb. 4, 2014, 17 Pages.
"Non-Final Office Action Issued in U.S. Appl. No. 10/607,020", dated Jul. 18, 2013, 16 Pages.
"Non-Final Office Action Issued in U.S. Appl. No. 10/607,020", dated Jun. 24, 2009, 19 Pages.
"Final Office Action Issued in U.S. Appl. No. 10/741,407", dated Jan. 23, 2007, 22 Pages.
"Non-Final Office Action Issued in U.S. Appl. No. 10/741,407", dated Jul. 26, 2006, 22 Pages.
"Notice of Allowance Issued in U.S. Appl. No. 10/741,407", dated Apr. 10, 2007, 8 Pages.
"Advisory Action Issued in U.S. Appl. No. 10/800,056", dated Feb. 14, 2007, 3 Pages.
"Amendment to Office Action Issued in U.S. Appl. No. 10/800,056", dated Jul. 27, 2006, 11 Pages.
"Amendment to Office Action Issued in U.S. Appl. No. 10/800,056", dated Jan. 19, 2007, 12 Pages.
"Office Action Issued in Korean Patent Application No. 10-2016-7024123", dated May 31, 2017, 11 Pages.
"First Examination Report Issued in Indian Patent Application No. 5323/CHENP/2011", dated Mar. 8, 2019, 7 Pages.
Shoup, Richard, "Menu-Driven User Interfaces for Videographics", In Proceedings of 17th Annual SMPTE Television Conference, Feb. 4, 1983, 3 Pages.
"Non Final Office Action Issued in U.S. Appl. No. 15/631,842", dated May 30, 2019, 14 Pages.
"Office Action Issued in Mexican Patent Application No. MX/a/2010/010506", dated Apr. 9, 2019, 17 Pages.

* cited by examiner

ASSOCIATING COMMAND SURFACES WITH MULTIPLE ACTIVE COMPONENTS

CROSS-REFERENCE TO RELATED APPLICATIONS

This application is a continuation of application Ser. No. 12/059,644, now U.S. Pat. No. 9,588,781, filed Mar. 31, 2008, which is hereby incorporated by reference in its entirety. To the extent appropriate, the present application claims priority to the above-referenced application.

BACKGROUND

In order to accommodate the diverse components supported by web platforms and applications, many online products and services implement user interface designs with distributed commands. These user interfaces feature numerous, distinct command surfaces such that each component in the application has its own command set. Each application is tightly integrated with its associated component in the user interface. For example, a web page may include two different components that include similar functionality (i.e. two different textboxes) but each component includes its own independent command surface.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The same command surface may be associated with unrelated components and applications on a page. Components register the commands associated with a shared command surface that they will be utilizing. Each component may utilize an arbitrary number of commands that are associated with the command surface. A command manager acts as a message broker between the components on the page and the shared command surfaces. When a command that is associated with a command surface is received, the command manager dispatches the command message to the appropriate components.

DETAILED DESCRIPTION

Figure 1:
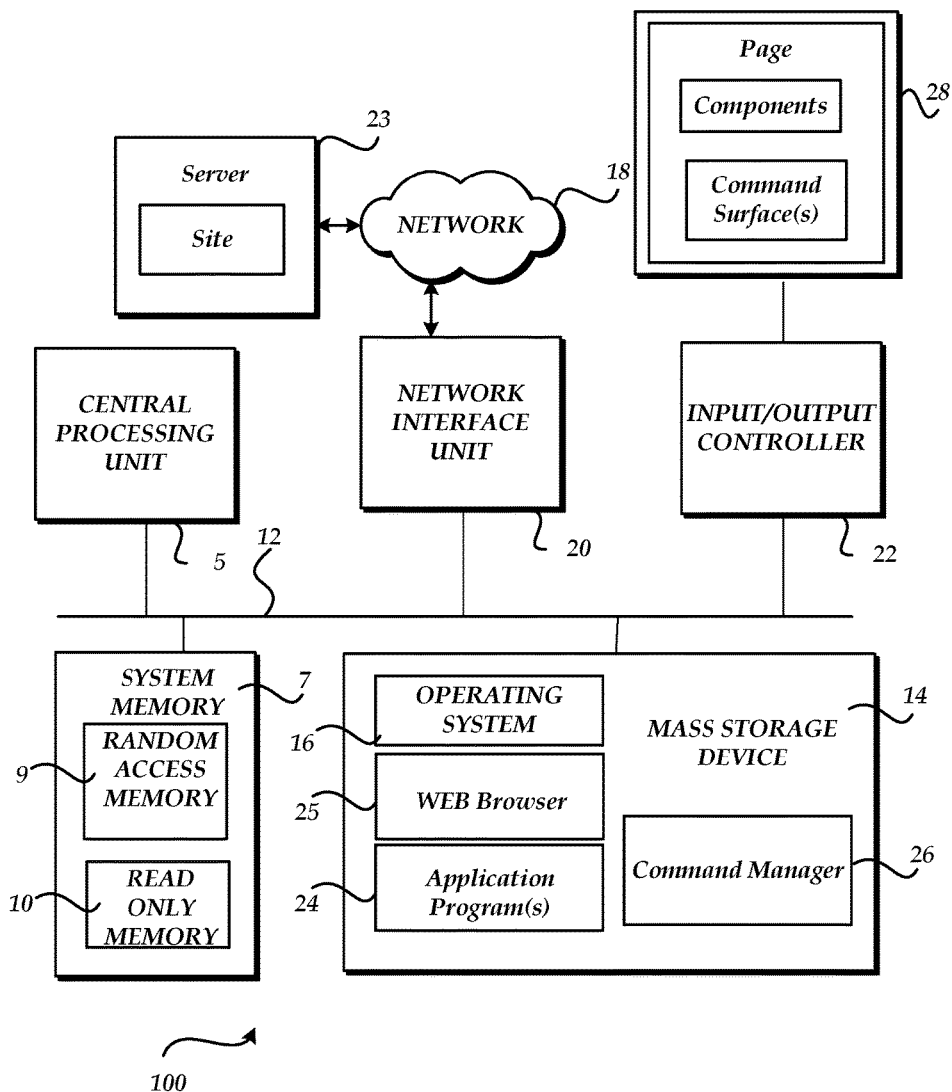
FIG. 1 illustrates an exemplary computing system.

Referring now to the drawings, in which like numerals represent like elements, various embodiments will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer architecture for a computer 100 utilized in the various embodiments will be described. While computer 100 is generally illustrated as a client computing device, computer 100 may be configured as a client, a server, mobile device, or any other computing device. Computer 100 includes a central processing unit 5 ("CPU"), a system memory 7, including a random access memory 9 ("RAM") and a read-only memory ("ROM") 10, and a system bus 12 that couples the memory to the CPU 5. A basic input/output system containing the basic routines that help to transfer information between elements within the computer, such as during startup, is stored in the ROM 10. The computer 100 further includes a mass storage device 14 for storing an operating system 16, application programs 24, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

According to various embodiments, computer 100 may operate in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a keyboard, mouse, or electronic stylus (not shown in FIG. 1). Similarly, an input/output controller 22 may provide output to a display screen that includes a user interface 28, a printer, or other type of output device. Computer 100 may also be coupled to data source(s) (not shown) through a network connection 18, and/or some other connection.

As mentioned briefly above, a number of program modules and data files may be stored in the mass storage device 14 and RAM 9 of the computer 100, including an operating system 16 suitable for controlling the operation of a networked personal computer, such as the WINDOWS VISTA® operating system from MICROSOFT CORPORATION of Redmond, Wash. The mass storage device 14 and RAM 9 may also store one or more program modules. In particular, the mass storage device 14 and the RAM 9 may store one or more application programs 26, such as a web browser application 25. For example, browser program 25 may be the MICROSOFT INTERNET EXPLORER® application.

Server 23 is configured to provide site services for computer 100. As illustrated, server 23 includes site software that is configured to provide a site that is accessed through browser application 25 on client 100. According to one embodiment, the site software, such as MICROSOFT SHAREPOINT SERVICES® may be used to provide collaboration tools, document storage tools and workflow tools that are associated with a site. For example, a site may be created with components that provide users (team members) with ways to share documents; share calendar or event information; generate and discuss ideas about a project; and adding, assigning, and tracking tasks concerning a project. The site may be configured as an Internet Site, Extranet Site, and/or an Intranet site or any other site that is accessible to users.

User interface (UI) 28 is designed to provide a user with a visual way to view the site and to interact with command surfaces and components on a web page. Instead of each command surface on a page being directly coupled to only one component on a page, the command surface may be coupled to more than one component on a page, even when the components are associated with different applications. As illustrated in UI 28, the same command surface on a page is associated with two different components (C1 and C2). The command surface may be a command surface such as a Ribbon, a toolbar, a pie menu, and the like. The components on the page may be unrelated and associated with different applications. Generally, each component registers the commands associated with a command surface that they will be utilizing with command manager 26. Command manager 26 acts as a message broker between the components on the page and the command surfaces. Each component may utilize an arbitrary number of commands that are associated with the command surface. For example, component C1 may use three of the commands from the command surface and C2 could use two of the commands. A component (e.g. C3) could be a component that is not visible to a user. For example, component C3 could be a spell checker that registers to be informed of a save command that is associated with the command surface. The components may also attach or detach from a command surface or dynamically change the number of commands during runtime. A component may register a command to be a focused command or a global command. When a command is registered as a global command by a component, then even when the component does not have the current focus it still receives the command when the command is activated on the command surface. When a command is registered as a focused command, then the component receives notification of the command when it is currently has the focus. When a command that is associated with a command surface is received, the command manager 26 dispatches the command message to the appropriate components. The operation of command manager 26 is described in more detail below.

Figure 2:
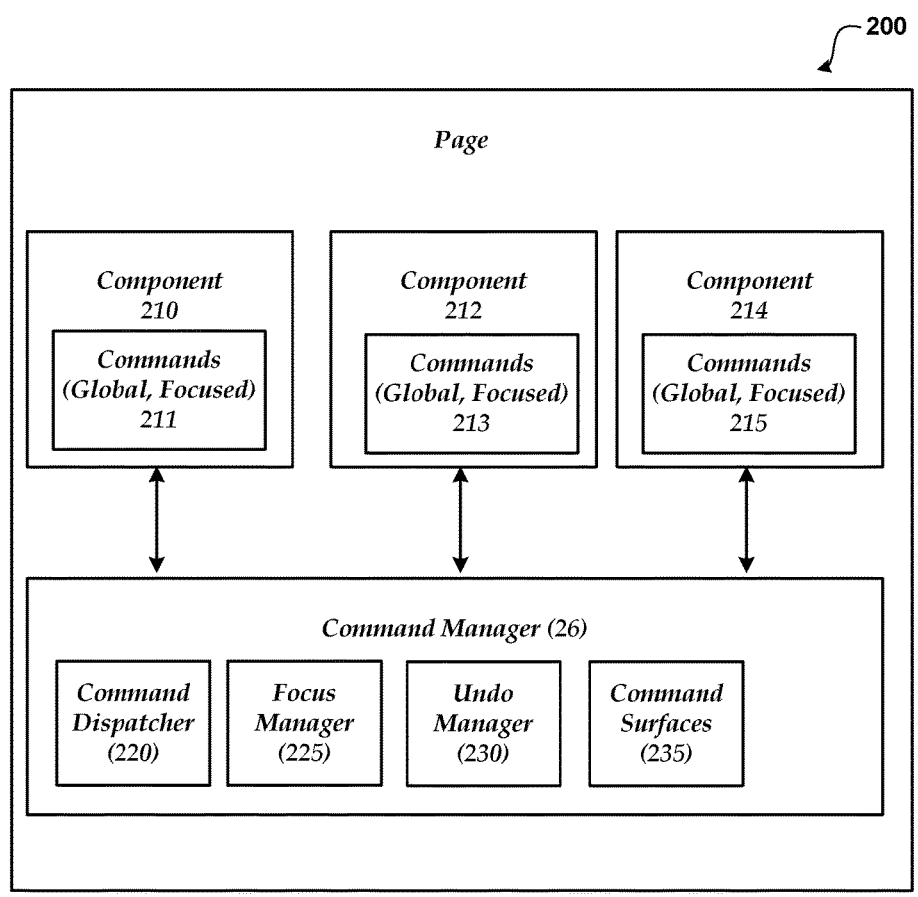
FIG. 2 shows a system for associating command surfaces with multiple active components.

FIG. 2 shows a system for associating command surfaces with multiple active components. As illustrated, system 200 includes page 205, component 210, component 212, component 214 and command manager 26 that includes command dispatcher 220, focus manager 225, undo manager 230, and command surfaces 235.

As discussed above, command manager 26 manages the interaction between the command surfaces and the different components. While command dispatcher 220, focus manager 225, undo manager 230, and command surfaces 235 are shown as integrated within command manager 26, some or all of their functionality may be located externally from command manager 26.

The components on page 205 may represent numerous applications and controls that are hosted in web sites, including web services and web applications. For example, rich text editors, clocks, spread sheet modules, data forms, drawing tools, and the like, are components that may be included on a page.

Any component that desires to utilize a shared command surface registers with command manager 26. After registering, or during registration, the component specifies the commands that they wish to be notified of when they occur on a command surface. According to one embodiment, the commands are specified to the command manager in a list of one or more commands (i.e. commands 211, 213 and 215). A component may specify the command to be a global command or a focused command. A global command is dispatched to the component by the command manager 26 even when that component does not have focus. In this way, a component may react to a command on a command surface even when that component is not active. A focused command is only dispatched to the component when that component has focus. A component may attach a command or detach a command from a command surface at any time. For example, a component may change the active commands available on the command surface based on the change of state of an application. The component may also specify whether or not it may receive focus.

The command manager 26 may periodically, or as a side effect of a particular event on the page, poll the registered components on behalf of the command surfaces in order to determine the state of each command that they are hosting. In one embodiment, this command state is composed of whether the command is currently enabled or disabled in the component and an collection of other state information associated with the command. For example, a "Bold" button may poll for whether it is currently enabled (turned on) or not in addition to whether the button is active in the command surface. According to one embodiment, when a command is received on a command surface (i.e. user clicks on a command) the command manager sends the command to the command dispatcher 220.

Command Dispatcher 220 interacts with the registered components on a page. In this example, command dispatcher 220 is configured to interact with component 210, component 212 and component 214. The command dispatcher is configured to dispatch commands to the components, request the state of commands and determine if the commands are enabled. The command dispatcher keeps a record of the command handlers registered for the commands and uses this information to route the commands and messages to the components. According to one embodiment, the command dispatcher 220 may send other messages to the components and/or additional information along with the dispatched commands. For example, the information may relate to data used in processing the command, state information, and the like. Commands from the command dispatcher may also run through the focus manager 225 as a proxy to help ensure that the correct components receive them commands. According to one embodiment, the focus manager is coupled between the main command dispatcher 220 and the components. In this embodiment, the focused commands are registered with the focus manager 225 and the focus manager 225 in turn registers for them with the main command dispatcher 220. When a command is dispatched through the main command dispatcher 220 into the focus manager 225, the focus manager 225 can then route the command according to which component, if any, currently has the focus.

The focus manager 225 manages the selection of components on page 200. The focus manager 225 is configured to keep track of the component that currently has the focus on the page (the active component). When an event occurs on the page (a user click for example), the component that detects the event may request, with the focus manager 225, that it become the active component. The focus manager 225 will then tell the previously active component to yield the focus. The focus manager 225 will then notify the requesting component that it now has the focus. When a selection occurs outside of an active component on the page, the focus manager may send a message to the components that no component is active, such that each of the components may detach focus. When the component receives focus, the command manager 26 sends a notification to the component such that it may request the current focus. Similarly, the component losing focus may be informed such that it may yield the current focus. According to one embodiment, when another component requests focus, the previously focused component is asked to yield focus by command manager 26.

Undo Manager 230 is used to undo/redo commands that have been executed. Undo manager 230 keeps track of the commands that have been executed, and when an undo or redo command is requested, it helps to ensure that the correct component receives the request to undo or redo the command.

Command surfaces 235 keeps track of the command surface(s) that are associated with the components on the page. The command surface may be any type of command surface such as a Ribbon, a toolbar, a pie menu, and the like. The command surface itself does not handle the processing of a command that is associated with it. Instead, when a command is activated on a command surface, the command manager 26 directs the command to the appropriate components on the page. According to one embodiment, command surfaces in command surfaces 235 support messages to refresh the control states of the commands that are associated as well as to enable/disable the commands for the components. The command surfaces also include defined methods for utilizing the command surface. For example, a method may be provided in a Ribbon control to show a previously unseen contextual tab. Upon initialization of the command surface by command manager 26, it draws its default content. According to one embodiment, the data associated with the command surface is stored within an XML file.

While not illustrated in FIG. 2, other functionality may be included within command manager 26. For example, other managers may be implemented. For instance, a task manager could be programmed to process work requests related to the components.

Figure 3:
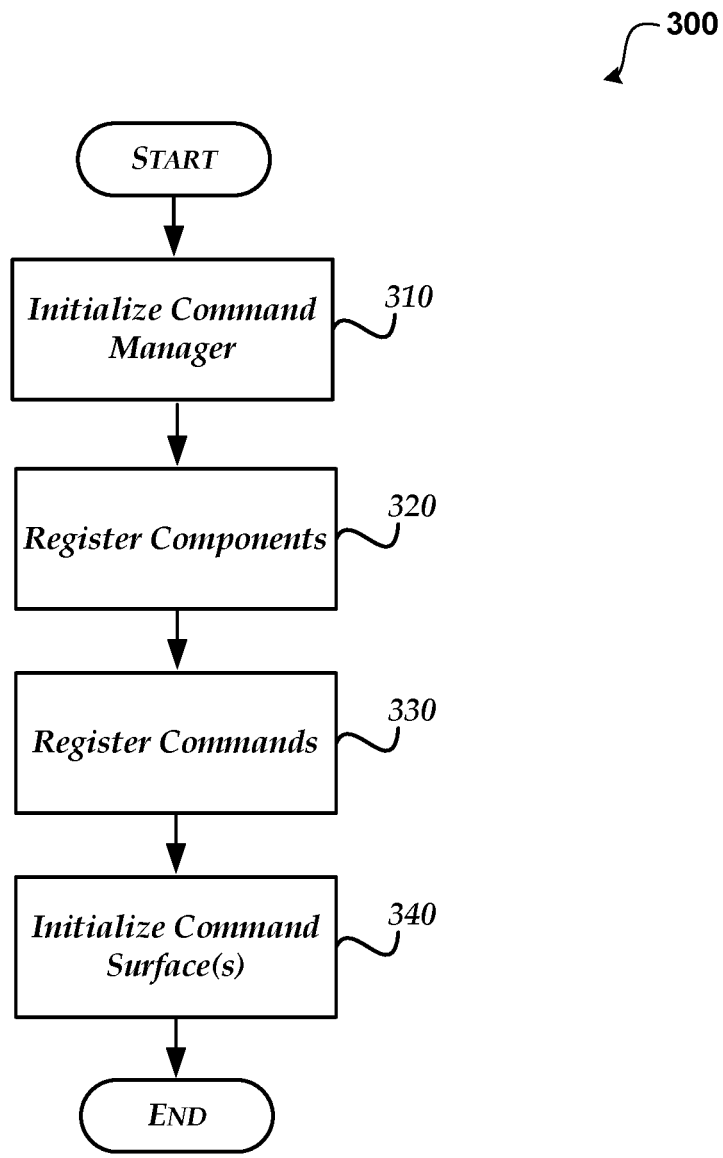
FIG. 3 illustrates a process for associating a command surface with multiple components.

Referring now to FIG. 3, an illustrative process for associating a command surface with multiple components is described.

When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start operation, process 300 flows to operation 310 where the command manager is initialized. The command manager acts as a message broker between the components on a page and the command surfaces. According to one embodiment, the command manager initializes the command dispatcher, the focus manager, the undo manager and the command surface(s) that are to be shared among components on the page.

Moving to operation 320, the components on the page are registered with the command manager. Any component on a page that desires to utilize a shared command surface registers with the command manager.

Flowing to operation 330, the components register the commands they wish to be notified of when they occur on a command surface. A component may register receive focused commands or global commands. When a command is registered as a global command by a component, then even when that component does not have the current focus it still receives the command when the command is activated on the command surface. When a command is registered as a focused command, then that component receives notification of the command only when it is currently has the focus. The component also provides methods to handle the commands when the component is called on to execute the command.

Transitioning to operation 340, the command surface(s) to be associated with the components are initialized. The command surface may be any type of command surface such as a Ribbon, a toolbar, a pie menu, and the like. Command surfaces support messages to refresh the control states of the commands that are associated with components as well as to enable/disable the commands for the components. The command surfaces also include defined methods for utilizing the command surface.

The process then flows to an end operation and returns to processing other actions.

Figure 4:
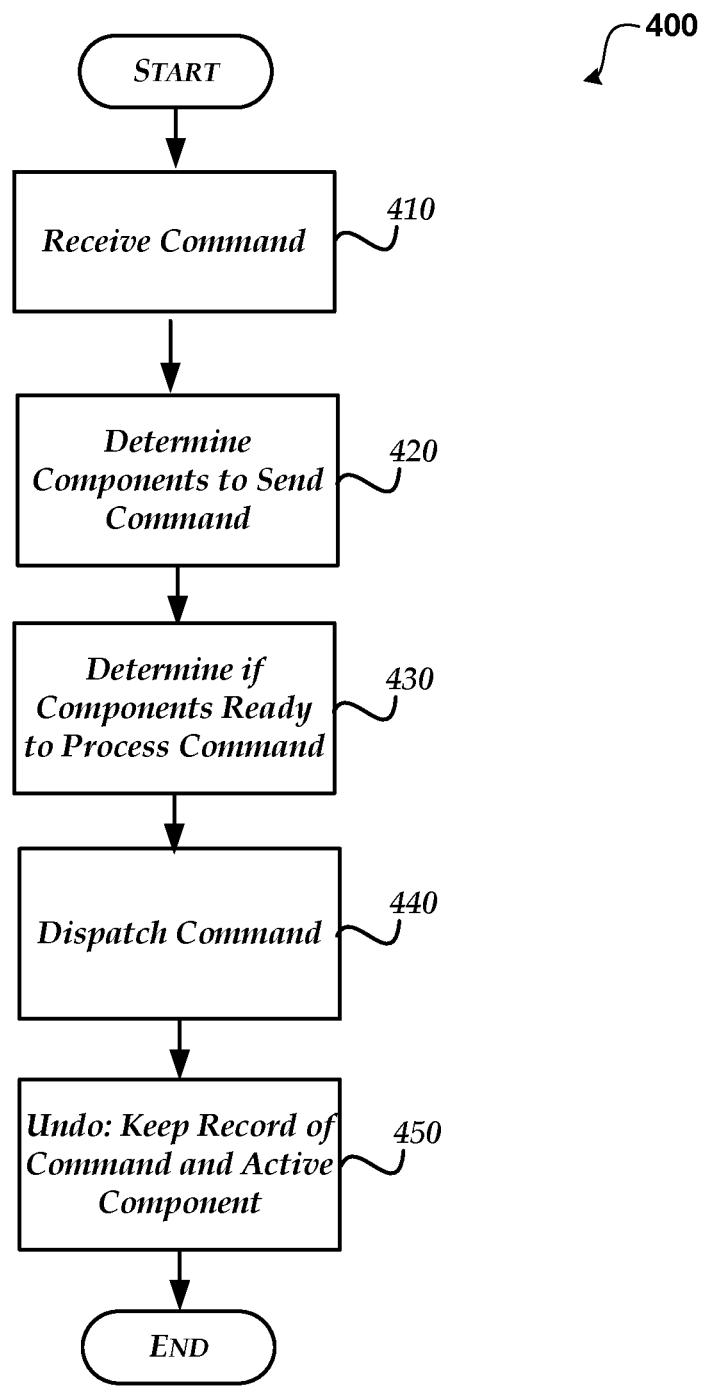
FIG. 4 shows a process for receiving and dispatching a command to components that is received from a command surface.

FIG. 4 shows a process for receiving and dispatching a command to components that is received from a command surface.

After a start operation, process 400 flows to operation 410 where the command is received from a command surface. When a command is activated on a command surface the command is redirected to the command manager that handles the routing of the command to the appropriate components.

Moving to operation 420, the components that are to receive the dispatched command are determined. Generally, the determination of where to dispatch the command is based on which components registered to receive notification of the commands as well as the current focus of the component. For example, as discussed above, some components desire to be informed of a command whenever it occurs, whereas other components desire to be informed only when they have the focus.

At operation 430, a determination may be made as to whether the determined components are ready to process the command. Before dispatching the command to the component(s), the command manager may poll the component(s) to determine if each component is ready to process the command.

For each component that is ready to process the command, the process moves to operation 440 where the command is dispatched to those determined components.

Moving to operation 450, a record is maintained regarding the commands that have been executed on the page and what components were notified. In this way, when an undo or redo command is requested, it helps to ensure that the correct component receives the request to undo or redo the command.

The process then flows to an end operation and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for associating a shared command surface with active components, comprising:
   associating a shared command surface with a component associated with an application;
   wherein the shared command surface includes user selectable commands for performing actions;
   receiving a registration from the component requesting notification when one or more of the commands on the shared command surface is activated, the registration comprising a command list of the one or more of the commands on the shared command surface and the command list specifying whether each of the one or more commands in the command list is a global command or a focused command, wherein the global command indicates to dispatch the command regardless of a current focus on the component and wherein the focused command indicates to dispatch the command based on the current focus on the component:
   determining when a particular command included on the shared command surface is activated;
   determining when the component should receive the particular command based on the particular command being included in the command list and based on whether the particular command is specified in the command list as a global command or a focused command: and
   dispatching the particular command to the component for processing when determined that the component should receive the particular command.

2. The method of claim 1, further comprising determining that the component is to receive the particular command when the particular command is associated with the component as a global command or as a focused command when the component has the current focus.

3. The method of claim 1, further comprising changing the current focus in response to receiving a request to change the focus from either the component or another component on a web page.

4. The method of claim 1, wherein receiving the registration comprises polling the component to acquire the command list.

5. The method of claim 1, further comprising maintaining record of commands that have been processed; and, when an undo procedure is initiated, informing components of commands to undo.

6. The method of claim 1, wherein the component can detach an associated command during runtime.

7. A non-transitory computer-readable storage medium having computer-executable instructions that, when executed by at least one processor, cause the at least one processor to perform a method for associating a command surface with active components, the method comprising:
   associating a shared command surface with a component associated with an application; wherein the shared command surface includes user selectable commands for performing actions;
   receiving a registration from the component requesting notification when one or more of the commands on the shared command surface is activated, the registration comprising a command list of the one or more of the commands on the shared command surface and the command list specifying whether each of the one or more commands in the command list is a global command or a focused command, wherein the global command indicates to dispatch the command regardless of a current focus on the component and wherein the focused command indicates to dispatch the command based on the current focus on the component:
   determining when a particular command included on the shared command surface is activated;
   determining when the component should receive the particular command based on the particular command being included in the command list and based on whether the particular command is specified in the command list as a global command or a focused command: and
   dispatching the particular command to the component for processing when determined that the component should receive the particular command.

8. The non-transitory computer-readable storage medium of claim 7, wherein the method further comprises determining that the component is to receive the particular command when the particular command is associated with the component as a global command or as a focused command when the component has the current focus.

9. The non-transitory computer-readable storage medium of claim 7, wherein the method further comprises changing the current focus in response to receiving a request to change the focus from either the component or another component on a web page.

10. The non-transitory computer-readable storage medium of claim 7, wherein accessing the command list for the component comprises polling the component to acquire the command list.

11. The non-transitory computer-readable storage medium of claim 7, wherein the method further comprises maintaining record of commands that have been processed; and, when an undo procedure is initiated, informing components of commands to undo.

12. The non-transitory computer-readable storage medium of claim 7, wherein the component can detach an associated command during runtime.

13. A system for associating a command surface with components, comprising:
   at least one processor;
   a memory, operatively connected to the at least one processor and storing instructions that, when executed by the at least one processor, cause the at least one processor to perform a method, the method comprising:

associating a shared command surface with a component associated with an application; wherein the shared command surface includes user selectable commands for performing actions;

receiving a registration from the component requesting notification when one or more of the commands on the shared command surface is activated, the registration comprising a command list of the one or more of the commands on the shared command surface and the command list specifying whether each of the one or more commands in the command list is a global command or a focused command, wherein the global command indicates to dispatch the command regardless of a current focus on the component, and wherein the focused command indicates to dispatch the command based on the current focus on the component;

determining when a particular command included on the shared command surface is activated;

determining when the component should receive the particular command based on the particular command being included in the command list and based on whether the particular command is specified in the command list as a global command or a focused command; and dispatching the particular command to the component for processing when determined that the component should receive the particular command.

14. The system of claim 13, wherein the method further comprises changing the current focus in response to receiving a request to change the focus from either the component or another component on a web page.

15. The system of claim 13, wherein accessing the command list for the component comprises polling the component to acquire the command list.

16. The system of claim 13, wherein the method further comprises maintaining record of commands that have been processed; and, when an undo procedure is initiated, informing components of commands to undo.

* * * * *